(12) United States Patent
Furuno et al.

(10) Patent No.: US 6,658,001 B1
(45) Date of Patent: Dec. 2, 2003

(54) PATH SETTING METHOD, COMMUNICATION UNIT AND STORAGE MEDIUM

(75) Inventors: Takayuki Furuno, Kawasaki (JP); Ayako Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/289,965

(22) Filed: Apr. 13, 1999

(30) Foreign Application Priority Data

Jul. 3, 1998 (JP) .......................................... 10-189432

(51) Int. Cl.⁷ .............................................. H04L 12/28
(52) U.S. Cl. .................................. 370/392; 370/395.54
(58) Field of Search .................................. 370/352–356, 370/389, 392, 395.1–395.6, 400–402, 409, 410, 404, 395.52, 395.54, 395.31

(56) References Cited

U.S. PATENT DOCUMENTS

| | | | | |
|---|---|---|---|---|
| 5,583,996 A | * | 12/1996 | Tsuchiya | 370/404 |
| 5,600,644 A | * | 2/1997 | Chang et al. | 370/404 |
| 5,909,441 A | * | 6/1999 | Alexander et al. | 370/395.54 |
| 5,946,311 A | * | 8/1999 | Alexander et al. | 370/395.53 |
| 5,982,773 A | * | 11/1999 | Nishimura et al. | 370/395.53 |
| 6,021,263 A | * | 2/2000 | Kujoory et al. | 709/232 |
| 6,172,991 B1 | * | 1/2001 | Mori | 370/395.31 |
| 6,421,321 B1 | * | 7/2002 | Sakagawa et al. | 370/395.52 |
| 6,452,921 B1 | * | 9/2002 | Alexander et al. | 370/395.54 |

FOREIGN PATENT DOCUMENTS

| | | |
|---|---|---|
| JP | 8-204713 | 8/1996 |
| JP | 8-279814 | 10/1996 |

* cited by examiner

*Primary Examiner*—Salvatore Cangialosi
(74) *Attorney, Agent, or Firm*—Staas & Halsey LLP

(57) ABSTRACT

A path setting method in a connection oriented network, includes the steps of resolving address information to set a shortcut path between a transmitting source device and a destination device, by use of a signaling message of a signaling protocol.

25 Claims, 19 Drawing Sheets

FIG. 9

| Message Type (SETUP, CONNECT, RELEASE, etc.) |
|---|
| Information Element Identifier (ex. Called Party Number IE) |
| Contents |
| Information Element Identifier (ex. QoS Parameter IE) |
| Contents |
| Information Element Identifier (ex. ATM Traffic Descriptor IE) |
| Contents |
| ⋮ |
| ⋮ |
| Information Element Identifier (ex. User-user IE) |
| Contents |

PATH SETTING METHOD, COMMUNICATION UNIT AND STORAGE MEDIUM

BACKGROUND OF THE INVENTION

1. Field of the Invention

The present invention generally relates to path setting methods, communication units and storage mediums, and more particularly to a path setting method which sets a short-cut path in an internetwork having a connection oriented network as an infrastructure, a communication unit which sets such a short-cut path, and a computer-readable storage medium which stores a program for causing a computer to set such a short-cut path.

Recently, much attention is drawn to the interworking of a Local Area Network (LAN) and an Asynchronous Transfer Mode (ATM) which is a switching system that provides high-speed switching by use of high-speed transmission line and hardware processing. The LAN was developed to realize a communication between computers in a relatively limited range. However, there are demands to connect distributed LANs by the ATM which provides a switching technique by use of the high-speed hardware processing, a high-speed interface and a long-distance transmission.

In addition, according to the ATM, it is possible to logically multiplex data types such as LAN data and audio data in one connection, and for this reason, it is possible to simplify the network itself. Such a simplified network enables a facilitated network management.

In order to realize the connection between the LANs by the ATM, it is necessary to provide a LAN service on an ATM network. Hence, standard protocols such as LAN Emulation Over ATM (LANE) and Multi-Protocol Over ATM (MPOA) have been prescribed. The LANE is used to set a connection within a sub network (hereinafter simply referred to as a subnet) which is logically defined in the ATM. On the other hand, the MPOA is used to set a connection spanning a plurality of subnets.

The LANE itself is described in Y. Hariguchi, "NETWORK TECHNOLOGY, ATM: LAN Emulation (LANE)", UNIX MAGAZINE 1998, 1, pp.29–40, and "Introduction to LAN, How to Avoid Bottleneck", NIKKEI COMMUNICATIONS 1997, 6.2, pp.72–80, for example. In addition, the MPOA itself is described in the latter article, that is, "Introduction to LAN, How to Avoid Bottleneck", NIKKEI COMMUNICATIONS 1997, 6.2, pp.72–80, for example. Accordingly, a detailed description on the LANE itself and the MPOA itself will be omitted in this specification.

As will be described later, the present invention provides a means for setting a connection at a high speed in a simple manner when communicating among a plurality of subnets using the MPOA, and the present invention is applicable to both private networks and public networks.

2. Description of the Related Art

A host unit connected to a LAN generates a frame when data is generated, and sends the frame on a shared media. The frame indicates address information such as an Internet Protocol (IP) address of a destination host unit and a Media Access Control (MAC) address. A host unit which is connected to the same shared media receives the frame if a destination address within the frame is the address of this host unit or, if this host unit judges that this host unit must forward the frame. Otherwise, this host unit discards the frame.

On the other hand, in the connection oriented network such as the ATM network, an ATM device sets a logical connection with a destination ATM device when the data is generated, and sends the data on the connection in the form of cells. As a result, it is possible to transmit the data only with respect to the device which is to receive the data, and it is unnecessary to carry out a process of checking the destination address at the receiving end, as is necessary in the case of the LAN.

Accordingly, in order to mutually connect two networks having different characteristics, it is necessary to use a special protocol such as the LANE and the MPOA described above.

The LANE, which is logically defined on the ATM network, provides the LAN services on a broadcast domain called Emulated LAN (ELAN). Hence, the LANE provides a protocol which enables a host unit on the LAN to make a communication without being aware of the ATM network. The LAN services provided on the broadcast domain include unicast, multicast, broadcast and the like. However, when making a communication between edge devices in an ATM network, the edge devices may belong to different ELANs although the edge devices are connected in the same ATM network. In other words, even though a direct connection can be set between the edge devices via an ATM switch, it is necessary to connect the ELANs via a router, similarly to the case where a router is required to connect the subnets on the LAN. For this reason, in a communication spanning a plurality of ELANs, the performance of the router through which the connection is made forms the bottleneck, thereby making it difficult to sufficiently utilize the performance of the ATM network.

The MPOA is a protocol which was standardized to eliminate the above described problems. According to the MPOA, an address resolution message defined by the MPOA is transmitted on the connection which is once set via the router using the LANE, so as to receive the ATM address from a device which becomes the final destination within the ATM network. By setting the connection directly to the destination device using this ATM address, it is possible to make a high-speed communication which is independent of the performance of the router.

FIG. 1 is a diagram showing the physical construction of an example of an ATM-LAN network. The ATM-LAN network includes an ATM switch 500, edge devices 501 and 502, routers 503 and 504, and ATM host units 506 and 507 which are connected as shown in FIG. 1. The edge device 501 is connected to a device 512, such as a work station, via a LAN 511. The edge device 502 is connected to a device, such as a work station, via a LAN 521. In the physical layer, the devices such as the edge devices 501 and 502, the routers 503 and 504, and the ATM host units 506 and 507 are connected to the ATM switch 50 by use of a physical medium such as an optical fiber cable and an Unshielded Twisted Pair (UTP) cable.

For example, the edge device 501 at the transmitting source (or request source) transmits a connection set request to the ATM switch 500 by use of a SETUP message of a signaling protocol for transmitting the cells. For example, the edge device 502 at the destination is specified by the ATM address. The ATM switch 500 transfers the SETUP message to the destination edge device 502, and in the process of transferring a CONNECT message from the destination edge device 502 to the transmitting source edge device 501, the ATM switch 500 assigns a connection identifier to each of the edge devices 501 and 502 which is unique in each physical medium, that is, a Virtual Path Identifier/Virtual Channel Identifier (VPI/VCI). By use of this connection identifier, it becomes possible to set a plurality of logical connections on one physical medium. The edge device 501 which transmits the cells indicates this connection identifier within a header of the cell. The ATM switch 500 recognizes the connection identifier of the received cell by hardware, and sends the cell via an appropriate path.

On the other hand, an internetwork protocol such as the IP operates in a layer in a higher level, and a logical subnet is formed by allocating an internetwork address such as the IP address to each device. In FIG. 1, the ATM switch 500, the edge device 501, the router 503 and the ATM host unit 506 form a subnet 511. In addition, the ATM switch 500, the routers 503 and 504, and the ATM host unit 507 form a subnet 512. Furthermore, the ATM switch 500, the edge device 502 and the router 504 form a subnet 513.

FIG. 2 is a diagram logically showing the physical construction of FIG. 1 from the internetwork point of view. In FIG. 2, those parts which are the same as those corresponding parts in FIG. 1 are designated by the same reference numerals, and a description thereof will be omitted. In FIG. 2, the subnets 511 through 513 form an ATM network 520.

FIG. 3 is a diagram showing a connection set procedure when making a communication between edge devices within an ELAN. An address resolution server which has binding information of the MAC address and the ATM address, that is, the address information of all of the edge devices within the ELAN, exists within the ELAN formed by the LANE. It is sufficient if one address resolution server is provided within each subnet, and for example, the address resolution server may be provided within the router. The transmitting source edge device which receives the data frame from a layer in the higher level, transmits to the address resolution server an address resolution message which indicates the destination MAC address within the frame, so as to acquire the ATM address of the destination edge device. After setting a connection to the destination edge device using the acquired ATM address, the data frame is sent on the connection in the form of cells. At the receiving end, the cells are assembled to form the frame.

In other words, in FIG. 3, a Virtual Channel Connection (VCC) is first set between the transmitting source edge device and the address resolution server based on the signaling protocol or configuration. The transmitting source edge device transmits an Address Resolution Request (ARReq) message to the address resolution server, and the address resolution server returns an Address Resolution Reply (ARRep) message to the transmitting source edge device in response to this ARReq message. The transmitting source edge device transmits a SETUP message to the destination edge device, and the destination edge device returns a CONNECT message to the transmitting source edge device in response to this SETUP message. As a result, the VCC is set between the transmitting source edge device and the destination edge device based on the signaling protocol.

FIG. 4 is a diagram showing a connection set procedure when making a communication between edge devices belonging to different ELANs. In FIG. 4, those parts which are the same as those corresponding parts in FIG. 3 are designated by the same reference numerals, and a description thereof will be omitted. In this case, a connection is set by ATM address resolution, similarly to the case shown in FIG. 3, but the case shown in FIG. 4 differs from the case shown in FIG. 3 in that a connection within a first subnet Subnet1 is once terminated by a router. The router forms a frame by assembling received cells, and uses a routing function to determine a destination port. In addition, the router resolves a destination MAC address from a destination IP address, and further executes an address resolution protocol of the LANE, so as to resolve by a final destination ATM address. Then, another connection is set between the router and a destination edge device, that is, within a second subnet Subnet2, and the router relays between the two connections.

FIG. 5 is a diagram showing a connection set procedure for a case where MPOA is used, when transmitting a data frame from one edge device to an edge device in another subnet. In FIG. 5, those parts which are the same as those corresponding parts in FIG. 4 are designated by the same reference numerals, and a description thereof will be omitted. The MPOA directly resolves an ATM address of a destination edge device when making a communication between edge devices belonging to different ELANs. More particularly, by transmitting an address resolution request of MPOA to the destination edge device on a connection which is set via a router using the LANE, the ATM address of the destination edge device is directly resolved. After the address resolution, the ATM address is used to set a direct connection between the edge devices, without via the router.

In other words, unlike the case shown in FIG. 4, when the connection is set between the transmitting source edge device and the router in the case shown in FIG. 5, a default route is set based on the signaling protocol, instead of setting the VCC based on the signaling protocol. In addition, after the connection is set between the router and the destination edge device and the VCC is set based on the signaling protocol, the transmitting source edge device transmits an Address Resolution Request for Shortcut (ARReqS) message to the router, and the router transmits this ARReqS message to the destination edge device. The destination edge device which receives the ARReqS message returns an Address Resolution Reply for Shortcut (ARRepS) message to the router, and the router returns this ARRepS message to the transmitting source edge device. Then, the transmitting source edge device transmits a SETUP message to the destination edge device, and the destination edge device returns a CONNECT message to the transmitting source edge device, so as to set a shortcut path between the transmitting source edge device and the destination edge device without routing.

Therefore, according to the conventional address resolution protocol, an address resolution server is generally provided in each subnet. An edge device in the subnet registers address information beforehand, and messages and procedures for obtaining this address information are defined.

When making the communication between the edge devices in different subnets as described above, it is possible to directly set the connection between the edge devices by using the protocol such as MPOA for resolving the destination ATM address. In addition, since it is possible to bypass the routing process, it is possible to thereafter make the data transfer at a high speed in a layer in a lower level.

However, the address resolution protocol is actually complex, and there was a problem in that it takes time to make the address resolution and set the connection from the time when a data transmission request is received from the layer in the higher level.

SUMMARY OF THE INVENTION

Accordingly, it is a general object of the present invention to provide a novel and useful path setting method, communication unit and storage medium, in which the problem described above is eliminated.

Another and more specific object of the present invention is to provide a path setting method, communication unit and storage medium, which can set a shortcut path at a high speed by simplifying the required process.

Still another object of the present invention is to provide a path setting method in a connection oriented network, comprising the steps of resolving address information to set a shortcut path between a transmitting source device and a destination device, by use of a signaling message of a signaling protocol. According to the path setting method of the present invention, the standard signaling protocol is extended so that the existing ATM switch (switching system) is not affected thereby, and for this reason, it is unnecessary to modify the construction of the ATM switch. In addition, compared to the conventional address resolution protocol such as the MPOA, it is possible to set the shortcut path at a high speed. Furthermore, the shortcut path can be set by either the transmitting source device or the destination device. On the other hand, because it is unnecessary to set a useless connection between the subnets for the address resolution, it is possible to save the resources. The layer in the higher level is unaffected by the setting of the shortcut path described above. Basically, all of the functions described above can be realized by simply modifying the software of the communication unit such as the edge device, the router and the server, and it is therefore possible to prevent the cost of the system from increasing considerably.

A further object of the present invention is to provide a communication unit for setting a path in a connection oriented network, comprising means for resolving address information to set a shortcut path between a transmitting source and a destination, by use of a signaling message of a signaling protocol. According to the communication unit of the present invention, the standard signaling protocol is extended so that the existing ATM switch (switching system) is not affected thereby, and for this reason, it is unnecessary to modify the construction of the ATM switch. In addition, compared to the conventional address resolution protocol such as the MPOA, it is possible to set the shortcut path at a high speed. Furthermore, the shortcut path can be set by either the transmitting source device or the destination device. On the other hand, because it is unnecessary to set a useless connection between the subnets for the address resolution, it is possible to save the resources. The layer in the higher level is unaffected by the setting of the shortcut path described above. Basically, all of the functions described above can be realized by simply modifying the software of the communication unit such as the edge device, the router and the server, and it is therefore possible to prevent the cost of the system from increasing considerably.

Another object of the present invention is to provide a communication unit for an internetwork having a connection oriented network as an infrastructure, wherein address information for setting a shortcut path between a transmitting source device and a destination device using a signaling message of a signaling protocol is resolved, and address information of the transmitting source device is notified to the destination device in a subnet different from a subnet to which the transmitting source device belongs by including the address information of the transmitting source device in a signaling message transmitted from the transmitting source device, and the communication unit comprises means for judging a network to which the destination device belongs, based on address information obtained from a received signaling message, by retrieving a routing table generated from a routing protocol operating in a high-level layer. According to the communication unit of the present invention, the standard signaling protocol is extended so that the existing ATM switch (switching system) is not affected thereby, and for this reason, it is unnecessary to modify the construction of the ATM switch. In addition, compared to the conventional address resolution protocol such as the MPOA, it is possible to set the shortcut path at a high speed. Furthermore, the shortcut path can be set by either the transmitting source device or the destination device. On the other hand, because it is unnecessary to set a useless connection between the subnets for the address resolution, it is possible to save the resources. The layer in the higher level is unaffected by the setting of the shortcut path described above. Basically, all of the functions described above can be realized by simply modifying the software of the communication unit such as the edge device, the router and the server, and it is therefore possible to prevent the cost of the system from increasing considerably.

Still another object of the present invention is to provide a computer-readable storage medium which stores a program for causing a computer having a communication function to set a path in a connection oriented network, comprising means for resolving address information for setting a shortcut path between a transmitting source and a destination by use of a signaling message of a signaling protocol. According to the storage medium of the present invention, the standard signaling protocol is extended so that the existing ATM switch (switching system) is not affected thereby, and for this reason, it is unnecessary to modify the construction of the ATM switch. In addition, compared to the conventional address resolution protocol such as the MPOA, it is possible to set the shortcut path at a high speed. Furthermore, the shortcut path can be set by either the transmitting source device or the destination device. On the other hand, because it is unnecessary to set a useless connection between the subnets for the address resolution, it is possible to save the resources. The layer in the higher level is unaffected by the setting of the shortcut path described above. Basically, all of the functions described above can be realized by simply modifying the software of the communication unit such as the edge device, the router and the server, and it is therefore possible to prevent the cost of the system from increasing considerably.

Other objects and further features of the present invention will be apparent from the following detailed description when read in conjunction with the accompanying drawings.

BRIEF DESCRIPTION OF THE DRAWINGS

FIG. 9 is a diagram showing the structure of general messages and information elements thereof which are used in a fourth embodiment of the path setting method according to the present invention;

DESCRIPTION OF THE PREFERRED EMBODIMENTS

In the present invention, address information of an edge device which is a transmitting source and transmits data is indicated by a signaling message, and this address information is mapped to a new signaling message which is generated by a router, so as to notify a final destination edge device. Accordingly, it is possible to bypass processing of the signaling message within each ELAN, and to set a shortcut path from the destination edge device to the transmitting source edge device.

According to the prior art, the address resolution protocol is executed after setting a connection via a router. But in the present invention, the address resolution protocol is executed before setting a connection via the router. As a result, the present invention does not require messages to be exchanged in order to carry out the address resolution, and the connection between the edge devices can be set within a short time.

Figure 6:
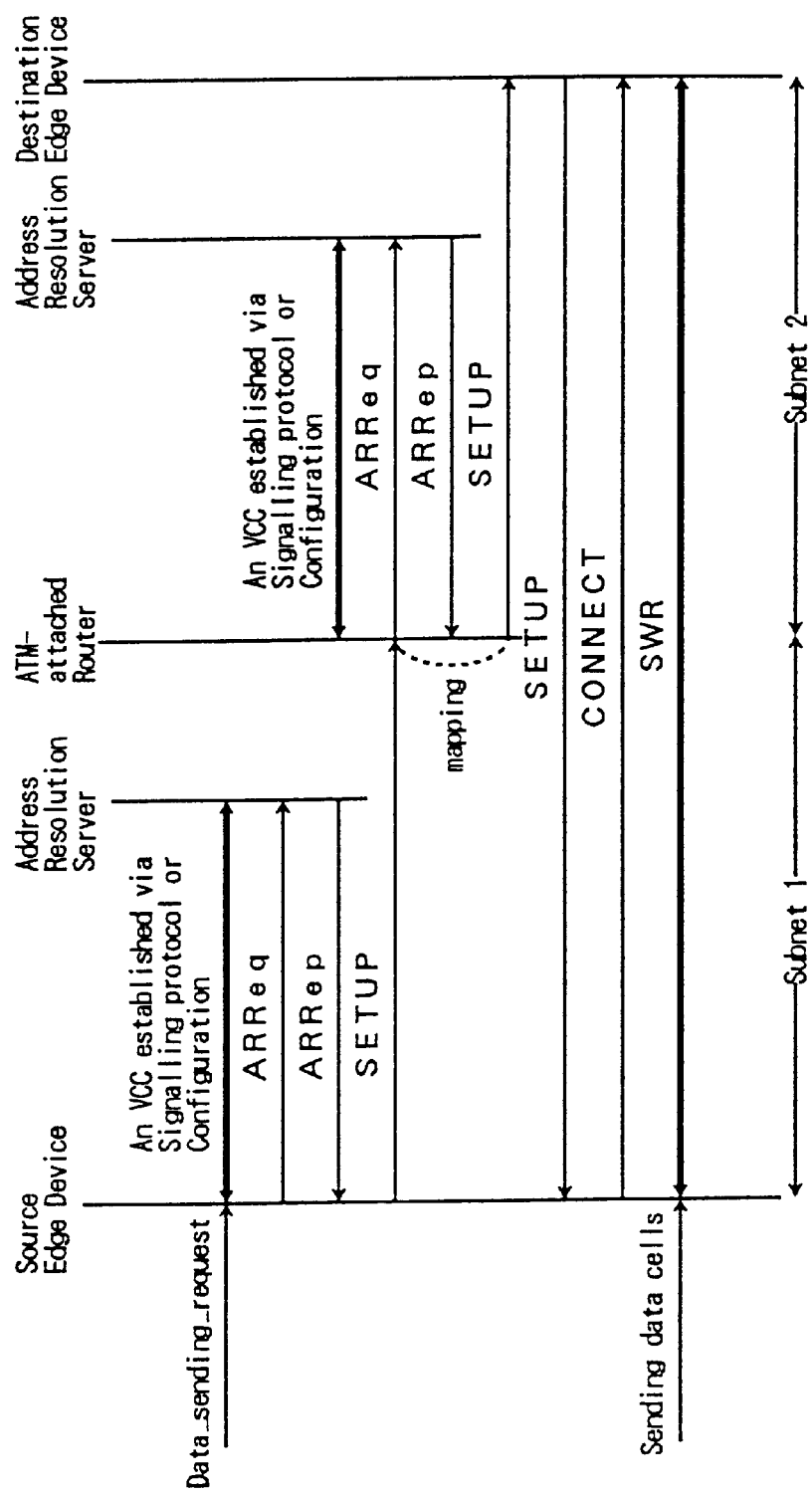
FIG. 6 is a diagram for explaining a first embodiment of a path setting method according to the present invention.

A description will now be given of embodiments of the present invention, by referring to FIG. 6 and the subsequent drawings.

Figure 1:
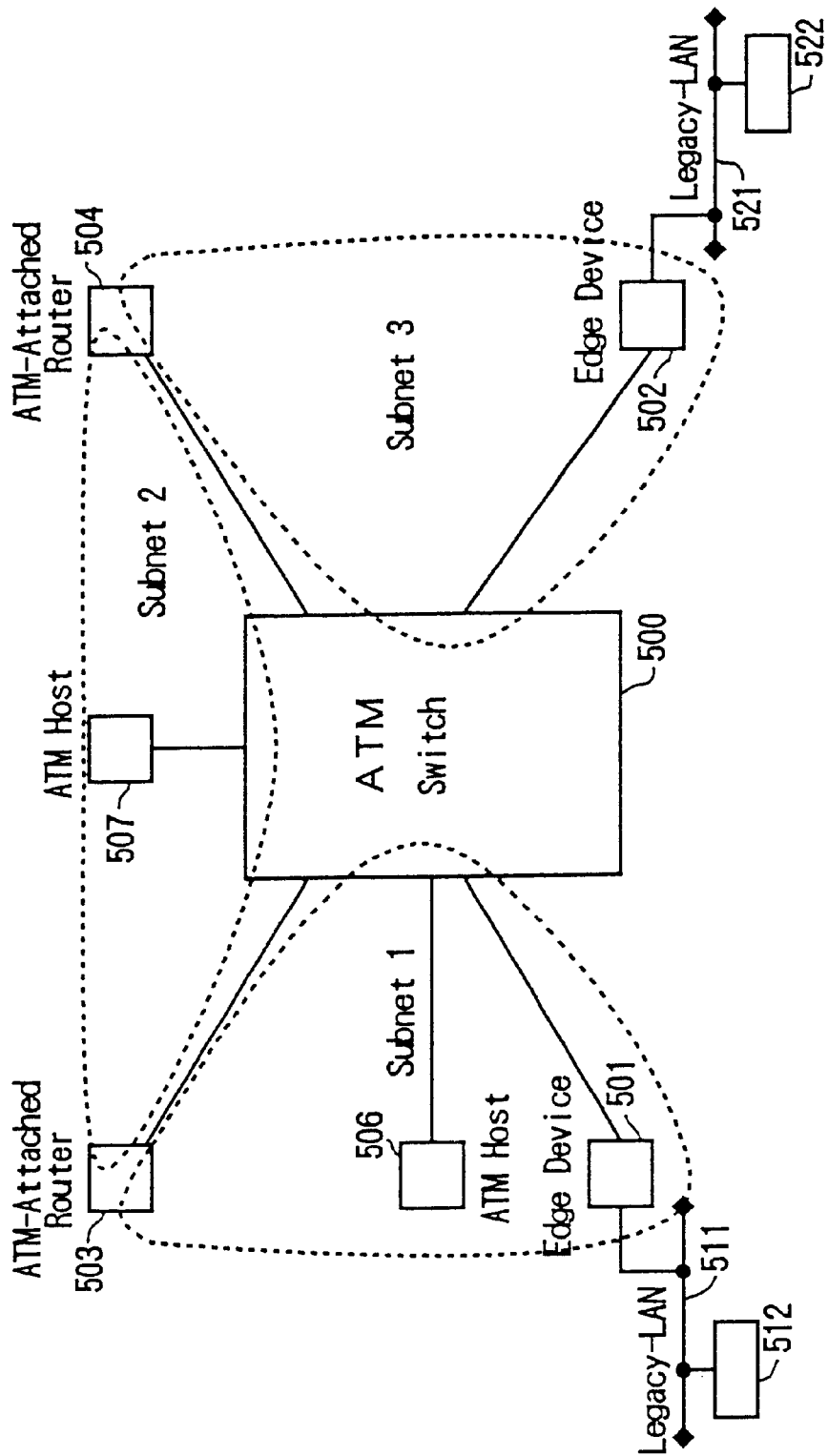
FIG. 1 is a diagram showing the physical construction of an example of an ATM-LAN network.
Figure 2:
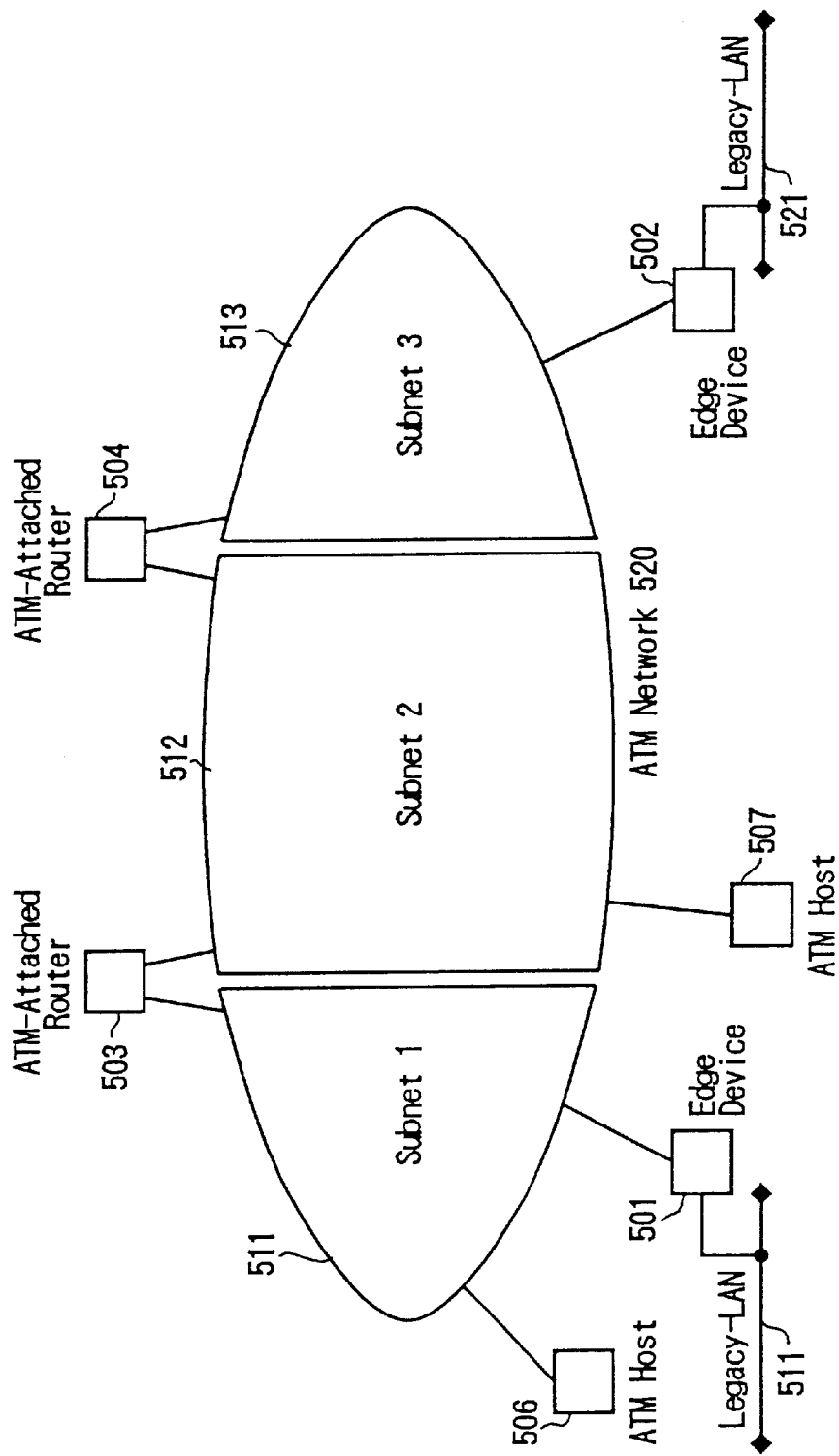
FIG. 2 is a diagram logically showing the physical construction shown in FIG. 1 from an internetwork point of view.

In the embodiments which will be described hereinafter, it is assumed for the sake of convenience that the present invention is applied to the network system described above in conjunction with FIGS. 1 and 2, and that the network system supports the following items.

Layer 3: IP
Layer 2: ATM
Connection Type: Switched Virtual Channel (SVC)

Figure 3:
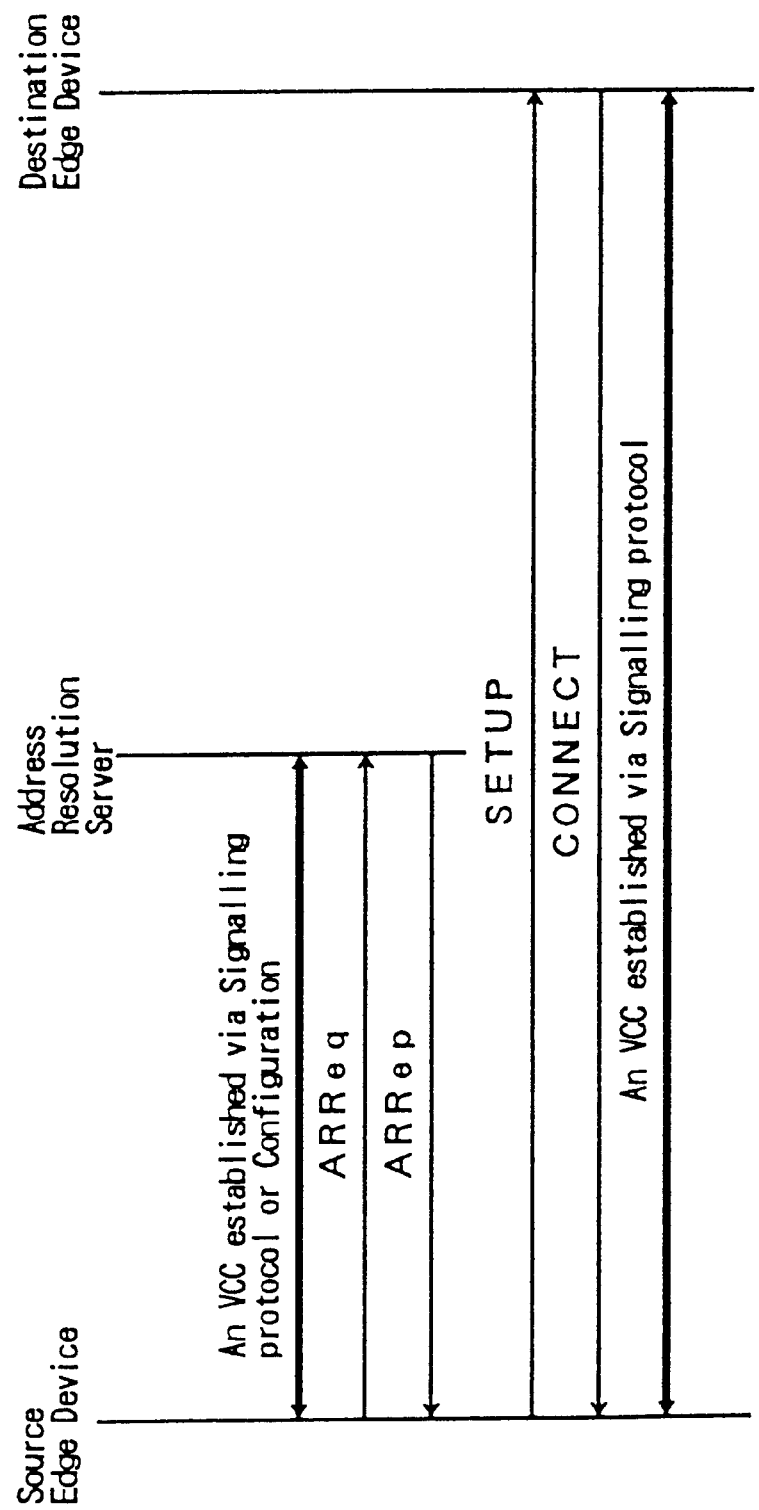
FIG. 3 is a diagram showing a connection set procedure when making a communication between edge devices within an ELAN.
Figure 4:
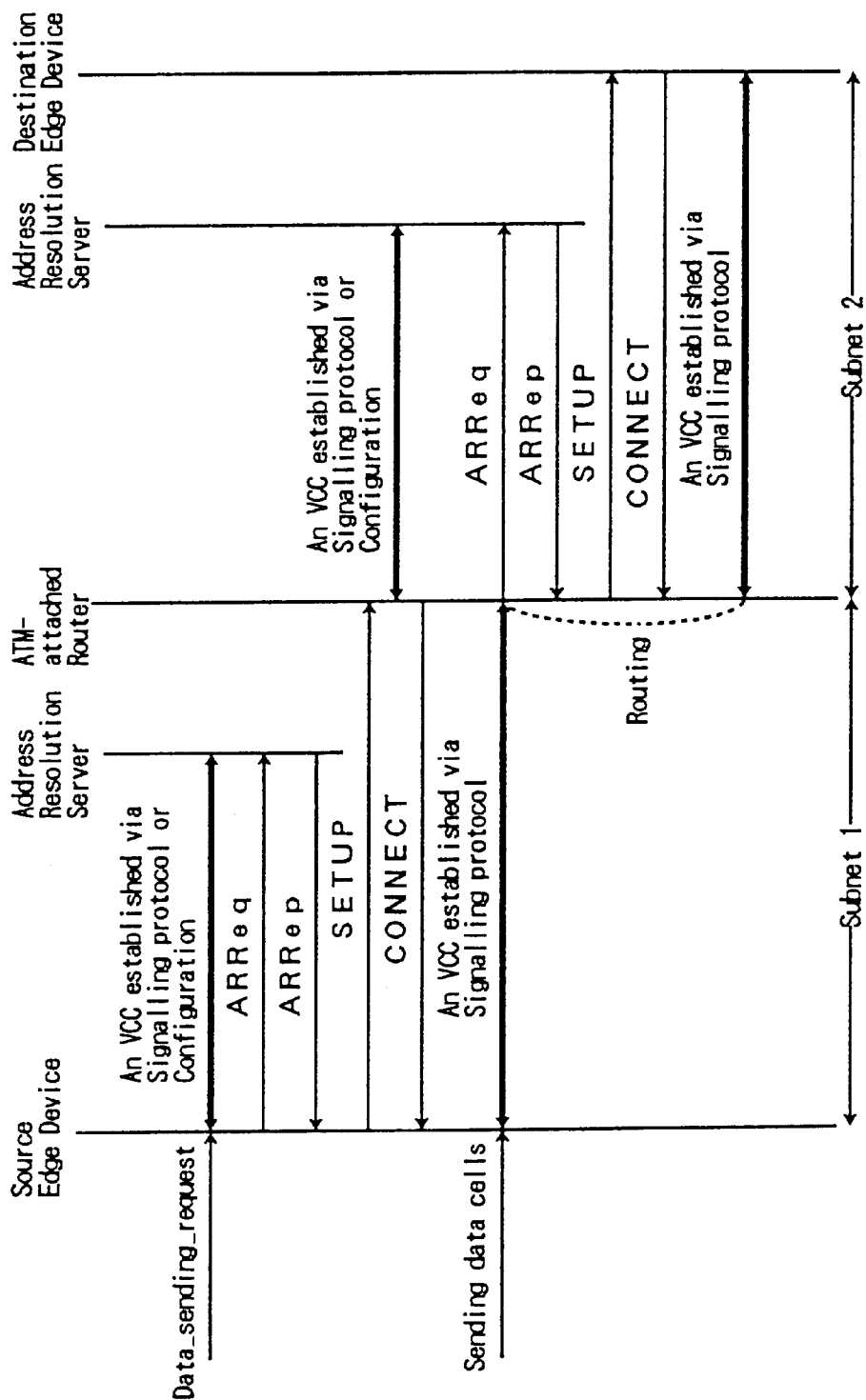
FIG. 4 is a diagram showing a connection set procedure when making a communication between edge devices belonging to different ELANs.
Figure 5:
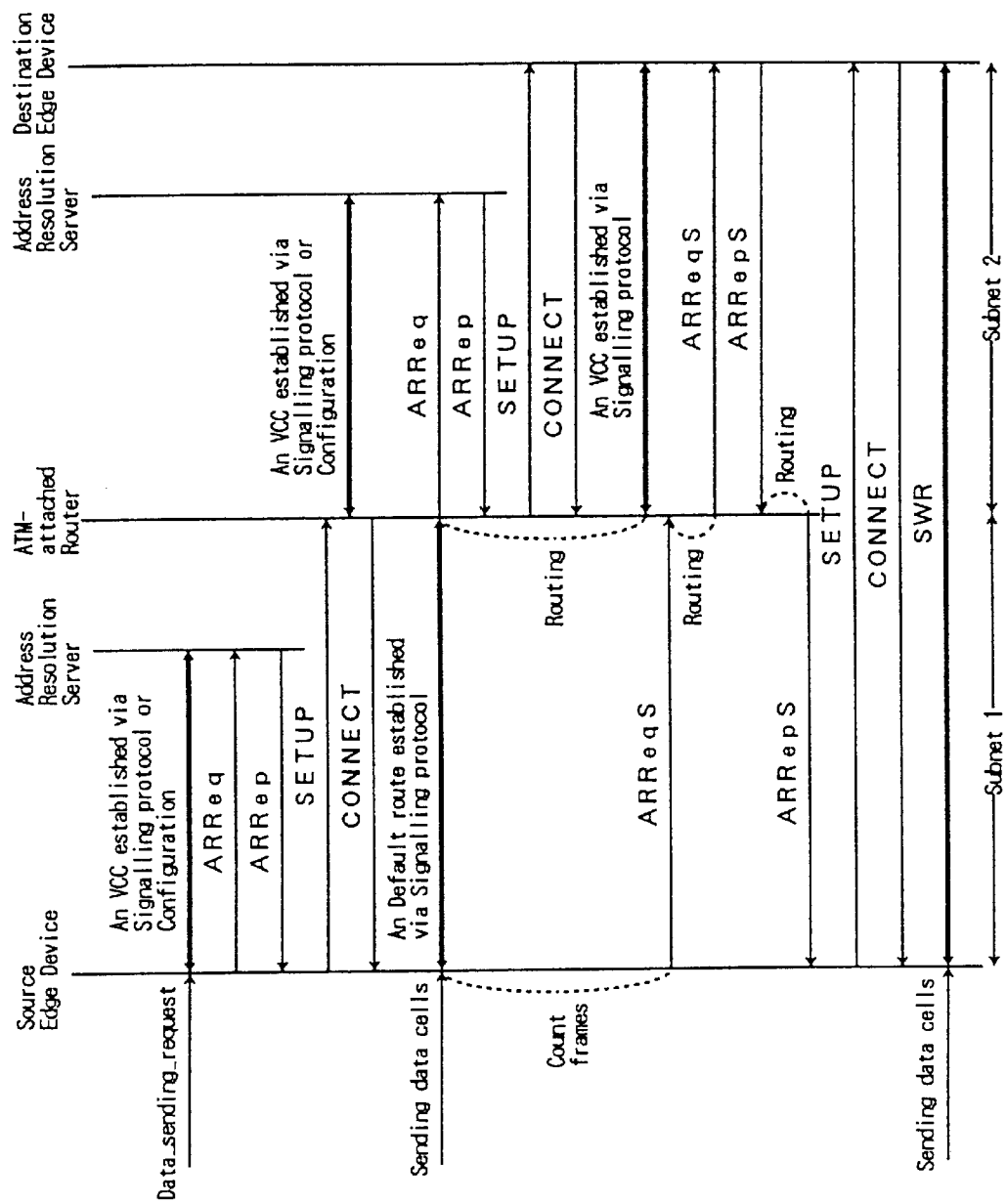
FIG. 5 is a diagram showing a connection set procedure for a case where MPOA is used when transmitting a data frame from one edge device to an edge device in a different subnet.

First, a description will be given of a first embodiment of a path setting method according to the present invention, by referring to FIG. 6. In FIG. 6, those parts which are the same as those corresponding parts in FIG. 5 are designated by the same reference numerals, and a description thereof will be omitted. In addition, in each of the embodiments described hereinafter, the SVC connection of the ATM is used between the edge device in the ATM network and the router, between the routers, and between the edge devices. As described above with respect to the prior art, the connection is set according to the procedure shown in FIG. 3 in the case of a communication within the same subnet.

As will be described hereinafter, in this embodiment, a router which receives a signaling message which is terminated within a subnet, carries out a mapping of a signaling message which is generated with respect to another subnet, so as to set a shortcut path within a short time.

1-1) Operation of Edge Device Receiving Data Transmission Request

The edge device receives a data frame transmission request from a layer in a higher level, and resolves an ATM address of a destination edge device if it is judged that a destination IP address of the received frame is an IP address in a different subnet. In other words, the edge device transmits a SETUP message on a signaling VCC, with respect to an appropriate router in the same subnet in which the edge device is provided. In this state, the SETUP message includes a User-User Information Element which can make a transparent information transfer between ATM end systems. This User-User Information Element indicates address information of a transmitting source edge device, and address information of a destination edge device which is obtained from the layer in the higher level. The address information of the transmitting source edge device is made up of the ATM address and the IP address, the ATM address and the MAC address or, the ATM address, the MAC address and the IP address. On the other hand, the address information of the destination edge device is made up of the IP address or, the IP address and the MAC address. When transmitting the SETUP message in this manner, a "User-Specific" is used for a Protocol Discriminator which is within the User-User Information Element and indicates the protocol type.

The information element itself such as the Protocol Discriminator is described in Y. Hariguchi, "NETWORK TECHNOLOGY, ATM: UNI Signaling (2)", UNIX MAGAZINE 1997, 12, pp.21–33, for example. Accordingly, a detailed description of the information element itself will be omitted in this specification.

1-2) Operation of Router Receiving SETUP Message

When the router receives the SETUP message described above, the router obtains the address information from the User-User Information Element, and supplies the address information to a signaling and routing function part within the router. The signaling and routing function part will be described later. The signaling and routing function part confirms the destination IP address within the supplied address information by referring to a routing table, and judges the network to which the destination IP address belongs. Generally, the routing table is created when the router operates a routing protocol such as a Routing Information Protocol (RIP) and an Open Shortest Path First (OSPF).

1-2a) Case Where Destination IP Address Is In Same Subnet:

When the signaling and routing function part of the router judges that the destination IP address is an IP address in the same subnet to which the router belongs, a new SETUP message is issued from the router with respect to the destination edge device. In this state, the router maps all information elements of the previously received SETUP message into the new SETUP message, except for a Calling Party Number Information Element and a Called Party Number Information Element.

1-2b) Case Where Destination IP Address Is In Different Subnet:

When the layer in the higher level judges that the received destination address is an address in a subnet different from the subnet to which the router belongs, a new SETUP message is issued from the router with respect to an appropriate router by referring to the routing table. In this state, the router maps all information elements of the previously received SETUP message into the new SETUP message, except for a Calling Party Number Information Element and a Called Party Number Information Element.

The operation under 1-2b) described above is repeated until the SETUP message is transferred to the router which belongs to the same subnet as the destination IP address. The operation continues to the operation under 1-2a) described above when the final router, that is, the router which belongs to the same subnet as the destination address, receives this SETUP message.

1-3) Operation of Edge Device Receiving SETUP message

When the destination edge device receives the SETUP message transferred from the router, the destination edge device obtains the ATM address of the transmitting source edge device from the SETUP message, and issues a SETUP message with respect to the transmission source edge device. In this case, since the destination ATM address is known, a direct connection can be set between the transmitting source edge device and the destination edge device without via the router. In FIG. 6, a Shortcut Without Routing (SWR) indicates setting of a shortcut path without routing.

Figure 7:
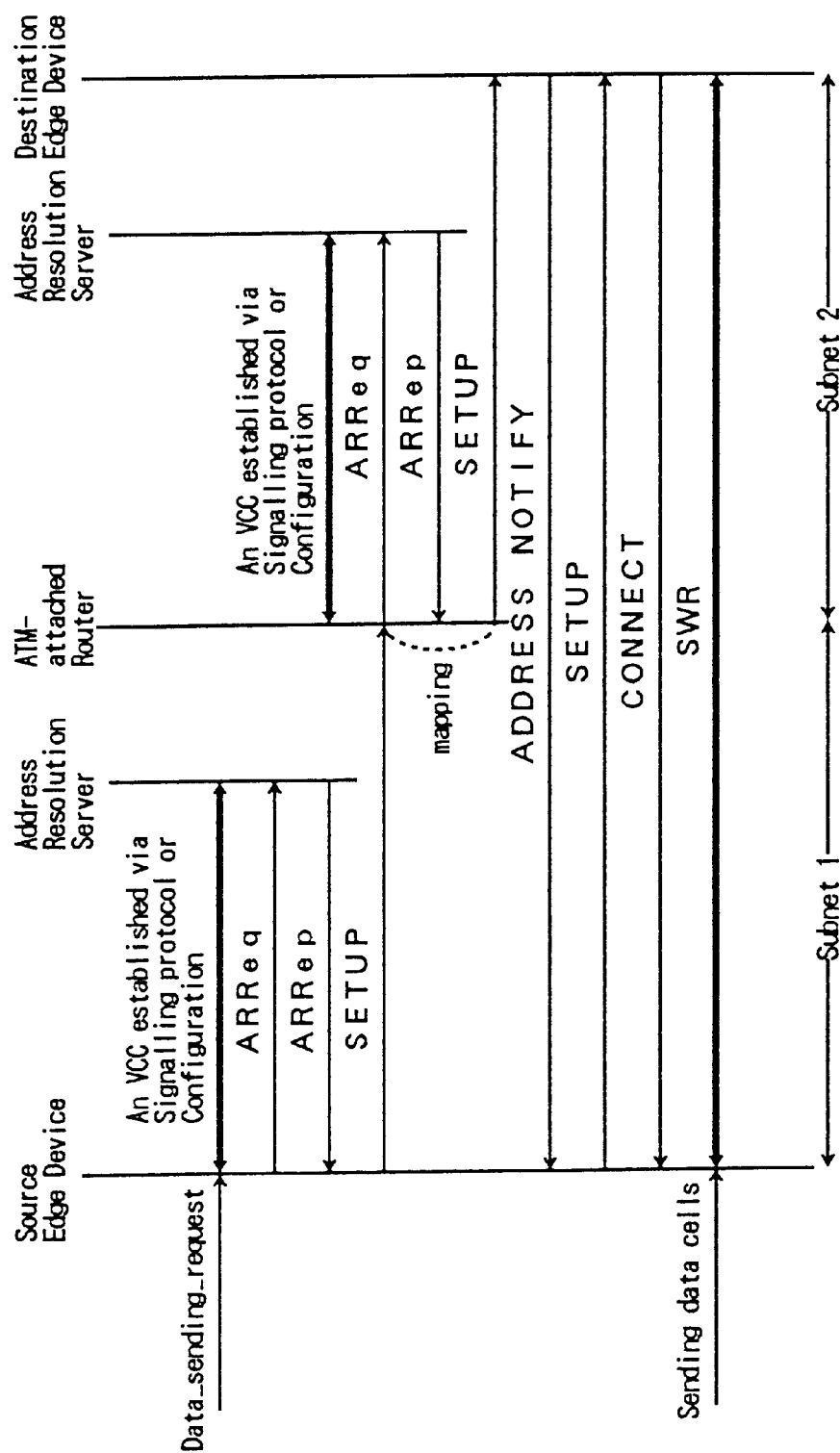
FIG. 7 is a diagram for explaining a second embodiment of the path setting method according to the present invention.

Next, a description will be given of a second embodiment of the path setting method according to the present invention, by referring to FIG. 7. In FIG. 7, those parts which are the same as those corresponding parts in FIGS. 5 and 6 are designated by the same reference numerals, and a description thereof will be omitted.

2-1) Indication of Signaling Parameters in SETUP Message:

In this embodiment, the transmitting source edge device includes information elements related to signaling parameters which are related to the connection which is to be finally set between the transmitting source edge device and the destination edge device, into the SETUP message together with the address information, in the procedure of the first embodiment described above. Such information elements are included in the SETUP message so that the SETUP message which is treated as a message for the address resolution will not be rejected by the ATM switch, and to indicate the request related to the connection which is to be later set between the edge devices. In other words, the SETUP message has the functions of both the signaling message and the address resolution message. For this reason, the SETUP message includes at least the essential information elements according to the signaling protocol.

The destination edge device which receives the SETUP message judges whether or not it is possible to accept traffic parameters and Quality of Service (QoS) parameters which are included in the signaling parameters. If the traffic parameters and the QoS parameters can be accepted, the destination edge device by itself sets a connection to the transmitting source edge device.

On the other hand, if the destination edge device which receives the SETUP message cannot accept the traffic parameters and the QoS parameters included in the signaling parameters, and cannot by itself set a connection to the transmitting edge device or, if the destination edge device rejects the setting of a connection by its own judgement, a newly defined signaling message is used to indicate this state. For example, an ADDRESS NOTIFY message shown in FIG. 7 is used as this newly defined signaling message. This ADDRESS NOTIFY message is returned directly to the transmitting source edge device without via the router, by using the address information obtained from the SETUP message from the transmitting end. In addition, the IP address and the ATM address of the destination edge device are indicated in the ADDRESS NOTIFY message using the User-User Information Element. Moreover, when returning the ADDRESS NOTIFY message to the transmitting source edge device, it is possible to indicate a parameter value which can be accepted by the destination edge device if the requested parameter value cannot be accepted by the destination edge device. In this case, only the parameters identical to those included in the SETUP message are included in the ADDRESS NOTIFY message.

The transmitting source edge device which receives the ADDRESS NOTIFY message judges that a call setup request will not be received from the destination edge device. In addition, when the parameter values of the information elements included in the ADDRESS NOTIFY message differ from the parameter values requested by the transmitting source edge device, he address information and the parameter values included in the ADDRESS NOTIFY message are used to set a connection from the transmitting source edge device to the destination edge device. In a case where the parameter values included in the ADDRESS NOTIFY message are the same as the parameter values requested by the transmitting source edge device or, the parameter values requested by the transmitting source edge device are not included in the ADDRESS NOTIFY message, the transmitting source edge device judges that the parameter values requested by the transmitting source edge device were accepted by the destination edge device. Accordingly, in this case, the transmitting source edge device uses the parameter values requested by the transmitting source edge device to set a connection directly to the destination edge device.

Figure 8:
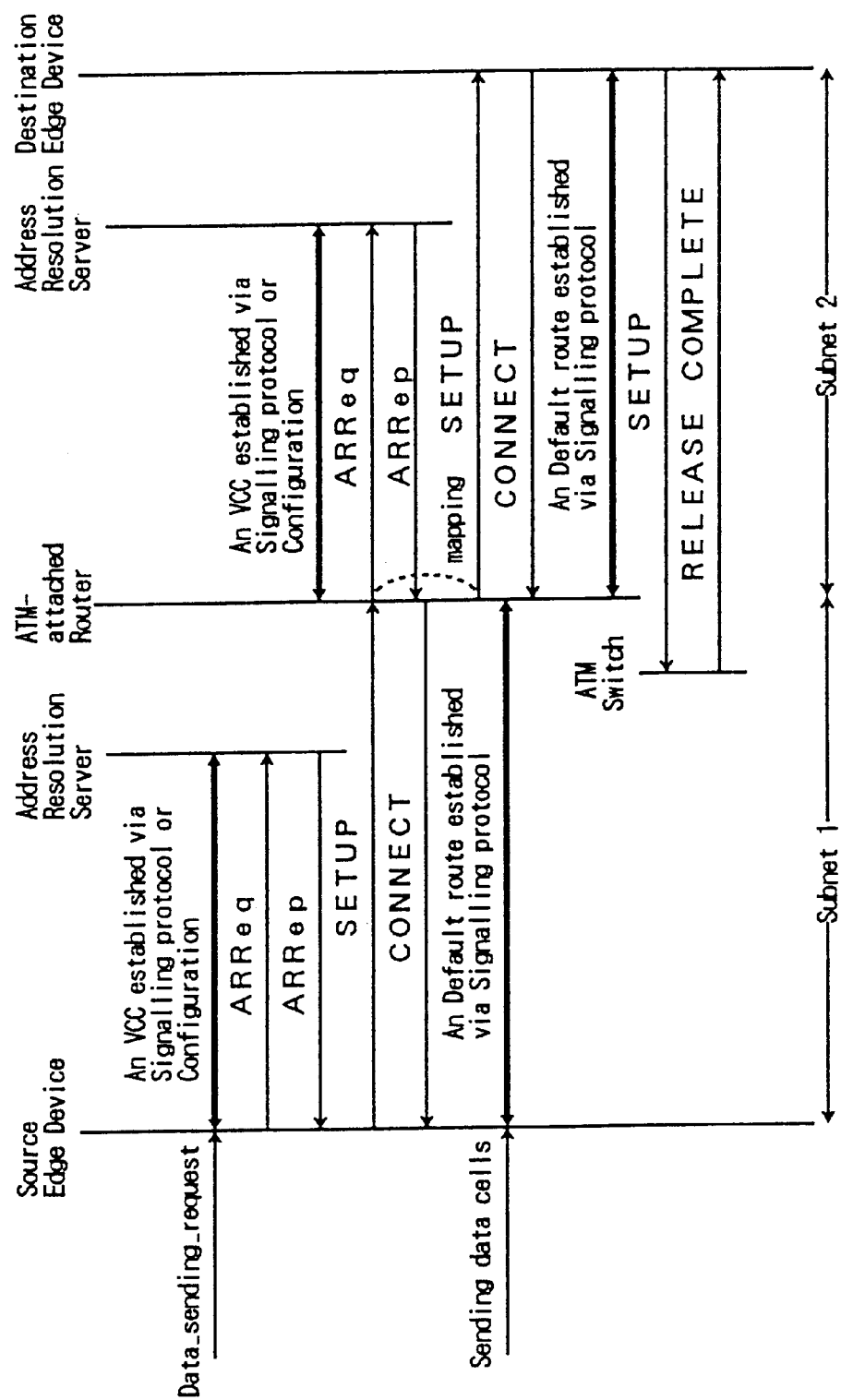
FIG. 8 is a diagram for explaining a third embodiment of the path setting method according to the present invention.

Next, a description will be given of a third embodiment of the path setting method according to the present invention, by referring to FIG. 8. In FIG. 8, those parts which are the same as those corresponding parts in FIGS. 5 and 6 are designated by the same reference numerals, and a description thereof will be omitted.

3-1) Transfer of SETUP Message By Trunk Device

In the first and second embodiments described above, the standard signaling message and the information elements are used for the address resolution message. Such an arrangement is employed so that the protocol used in the path setting method according to the present invention will not affect the existing ATM switch. Consequently, the ATM switch processes the address resolution message as if it were a signaling message.

But actually, the router and the destination edge device which receive the SETUP message described above merely transfer the SETUP message. Hence, as shown in FIG. 8, the router and the destination edge device which receives the SETUP message may respond by a RELEASE COMPLETE message with respect to the transmitting end, but there is no necessity for the router and the destination edge device to respond. In the case where the router and the destination edge device do not respond with respect to the transmitting end when the SETUP message is received, it is simply judged that the setup failed after lapse of a time that is timed by a timer which is prescribed by the signaling protocol.

3-2) Response To SETUP Message By Trunk Device

As described above, it is possible to set a default route via the router as shown in FIG. 8, by carrying out the process of transferring the SETUP message as the address resolution message, and treating the SETUP message as the signaling message, that is, responding by a CONNECT message. As a result, it is possible to use the default route in a case where the shortcut path which is to be set originally between the edge devices cannot be set for some reason.

Next, a description will be given of a fourth embodiment of the path setting method according to the present invention, by referring to FIG. 9. FIG. 9 is a diagram showing the construction of general messages used in this embodiment and information elements within these messages. In FIG. 9, the signaling message includes a message type such as SETUP, CONNECT and RELEASE, an Information Element Identifier such as Called Party Number Information Element, QoS parameter information element, ATM Traffic Descriptor Information Element (IE) and User-User Information Element, and Contents.

4-1) Definition of New Information Elements For Indicating Address Information The SETUP message which is used for the address resolution in the first and second embodiments described above makes it possible to recognize that the SETUP message is not a normal signaling protocol by confirming the contents of the User-User Information Element. But since the "User-Specific" is implemented by a vender who freely sets a code point, although the possibility is extremely small, there is a possibility of an erroneous operation being carried out when a connection is made to a system of another vender.

Hence, this embodiment also takes into consideration newly defining new information elements which are not prescribed by the standard. For example, the new information elements which are newly defined include a Source Party Address Information Element and Destination Party Address Information Element. The Source Party Address Information indicating the IP address of the transmitting source edge device is included in the SETUP message which is issued from the transmitting source edge device. In addition, when the edge device which receives this SETUP message does not set a connection by itself, that is, when the edge device returns the ADDRESS NOTIFY message in response to the received SETUP message, the edge device includes the Destination Party Address Information Element which indicate the IP address and the ATM address of the edge device in the ADDRESS NOTIFY message. In this case, it is possible, as an option, to include the Source Party Address Information Element in the ADDRESS NOTIFY message. Hence, when information elements which cannot be recognized by the standard protocol are received, this embodiment does not reject the call but is prescribed to process only the recognizable information elements, so that the existing ATM switch will not be affected.

Next, a description will be given of a fifth embodiment of the path setting method according to the present invention.

5-1) Indication of Identifier

In this embodiment, in order to associate the SETUP message transmitted from the transmitting source edge device in the first and second embodiments described above with respect to the SETUP message and the ADDRESS NOTIFY message transmitted from the destination edge device without via the router in response to the SETUP message transmitted from the transmitting source edge device, the transmitting source edge device includes an information element which indicates an identifier in these messages. For example, a Call Associate Information Element is included in the messages as the information element which indicates the identifier. Such an allocation of the identifier is made in the transmitting source edge device. The destination edge device maps the Call Associate Information Element within the SETUP message transferred from the router into the SETUP message or the ADDRESS NOTIFY message generated by the destination edge device.

In addition, the edge device can distinguish the standard signaling message and the message which is used for the address resolution in this embodiment, based on the existence of the User-User Information Element and the Call Associate Information Element.

Next, a description will be given of a sixth embodiment of the path setting method according to the present invention.

6-1) Address Information Cache

In this embodiment, the destination edge device which receives the SETUP message transferred from the transmitting source edge device in the first embodiment described above, stores the address information obtained from this SETUP message into a cache within the destination edge device. This cache will be described later. This cache stores a combination of the IP address and the ATM address, the MAC address and the ATM address or, the MAC address, the IP address and the ATM address.

Similarly, in this embodiment, the transmitting source edge device which receives the SETUP message or the ADDRESS NOTIFY message transmitted from the destination edge device in the second embodiment-described above, stores the address information obtained from the received message into a cache within the transmitting source edge device. This cache will be described later.

In addition, the router may store into a cache thereof the address information which is obtained when relaying the SETUP message described above. This cache will also be described later.

According to the first through sixth embodiments described above, the standard signaling protocol is extended so that the existing ATM switch (switching system) is not affected thereby, and for this reason, it is unnecessary to modify the construction of the ATM switch. In addition, compared to the conventional address resolution protocol such as the MPOA, it is possible to set the shortcut path at a high speed. Furthermore, the shortcut path can be set by either the transmitting source device or the destination device. On the other hand, because it is unnecessary to set a useless connection between the subnets for the address resolution, it is possible to save the resources. The layer in the higher level is unaffected by the setting of the shortcut path described above. Basically, all of the functions described above can be realized by simply modifying the software of the communication unit such as the edge device, the router and the server, and it is therefore possible to prevent the cost of the system from increasing considerably.

Next, a description will be given of an embodiment of a communication unit according to the present invention. The communication unit according to the present invention is at least one of the edge devices 501 and 502, the routers 503 and 504, and the ATM host units 506 and 507 shown in FIGS. 1 and 2. This embodiment of the communication unit employs any one of the first through sixth embodiments of the path setting method described above.

Figure 10:
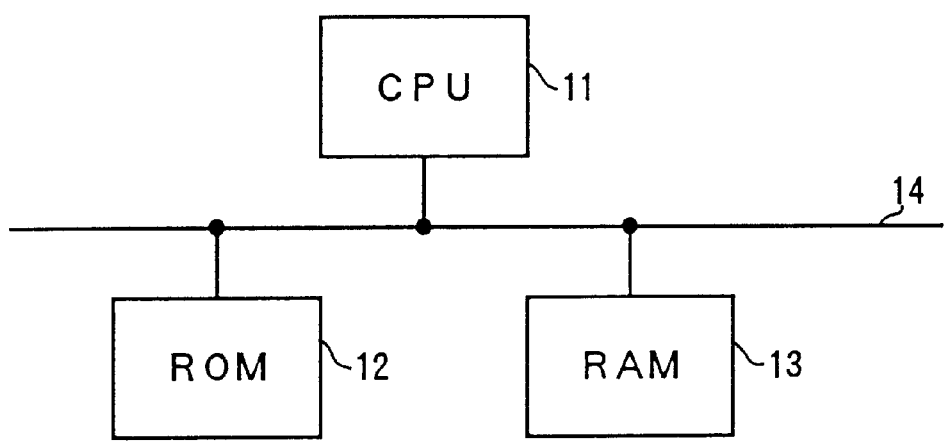
FIG. 10 is a system block diagram showing an embodiment of a communication unit according to the present invention.

FIG. 10 is a system block diagram showing this embodiment of the communication unit. The basic construction of the communication unit is the same regardless of whether the communication unit is an edge device, a router or a host unit. The basic construction of the communication unit is formed by a computer which includes a central processing unit (CPU) 11, a ROM 12 and a RAM 13 which are coupled via a bus 14 as shown in FIG. 10. The CPU 11 is provided to control the entire communication unit, and is connected to at least one of a LAN interface and an ATM interface. The ROM 12 is provided to store data and programs to be executed by the CPU 11. The RAM 13 is provided to store data such as intermediate data which are obtained during operation processes carried out by the programs executed by the CPU 11. The RAM 13 is also used as the cache described above. The ROM 12 and the RAM 13 may be formed by a single memory which may be a semiconductor memory device, a disk drive unit or the like.

Figure 11:
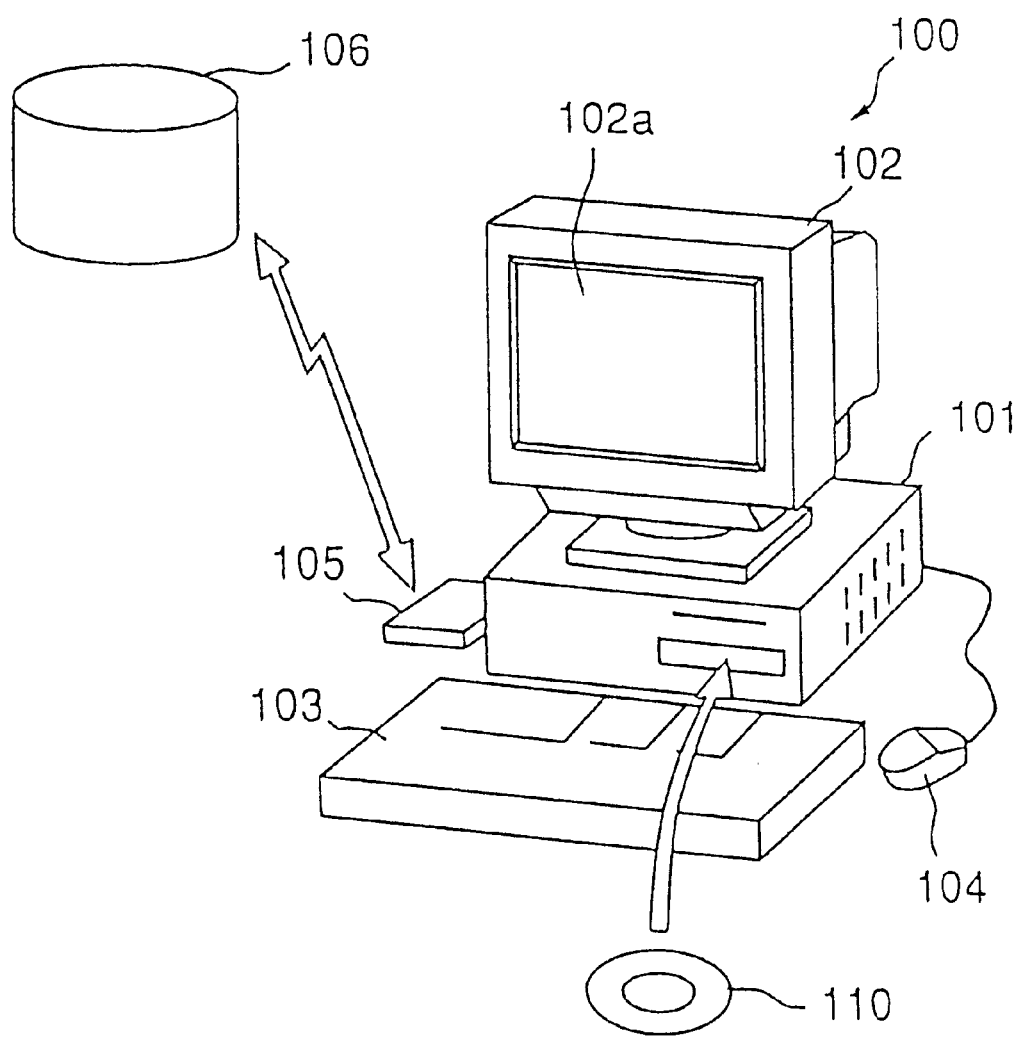
FIG. 11 is a perspective view showing the general construction of a computer system including a computer shown in FIG. 10.

FIG. 11 is a perspective view showing the general construction of a computer system which includes the computer shown in FIG. 10. A computer system 100 shown in FIG. 11 includes a main body part 101 which includes the CPU 11, the disk drive unit and the like, a display 102 which displays an image on a display screen 102 in response to an instruction from the main body part 101, a keyboard 103 which is used to input various information to the computer system 100, a mouse 104 which is used to specify an arbitrary position on the display screen 102a of the display 102, and a modem 105 which is used to make access to an external database or the like so as to download a program or the like stored in another computer system.

The program which causes the communication unit to operate according to any one of the first through sixth embodiments of the path setting method described above, is stored in a portable storage medium such as a disk 110. Alternatively, the program is downloaded from a storage medium 106 of another computer system using the communication function of the modem 105 or the like. The program is input to the computer system 100 and compiled.

A storage medium according to the present invention is formed by a computer-readable storage medium such as the disk 110, which stores a program for causing the communication unit to operate according to any one of the first through sixth embodiments of the path setting method described above. The storage medium is of course not limited to portable storage mediums such as an integrated circuit (IC) card memory, a floppy disk, a magneto-optical disk and a CD-ROM, but also includes storage mediums which are accessible by a computer which is connected via a communication means such as a modem and LAN.

Figure 12:
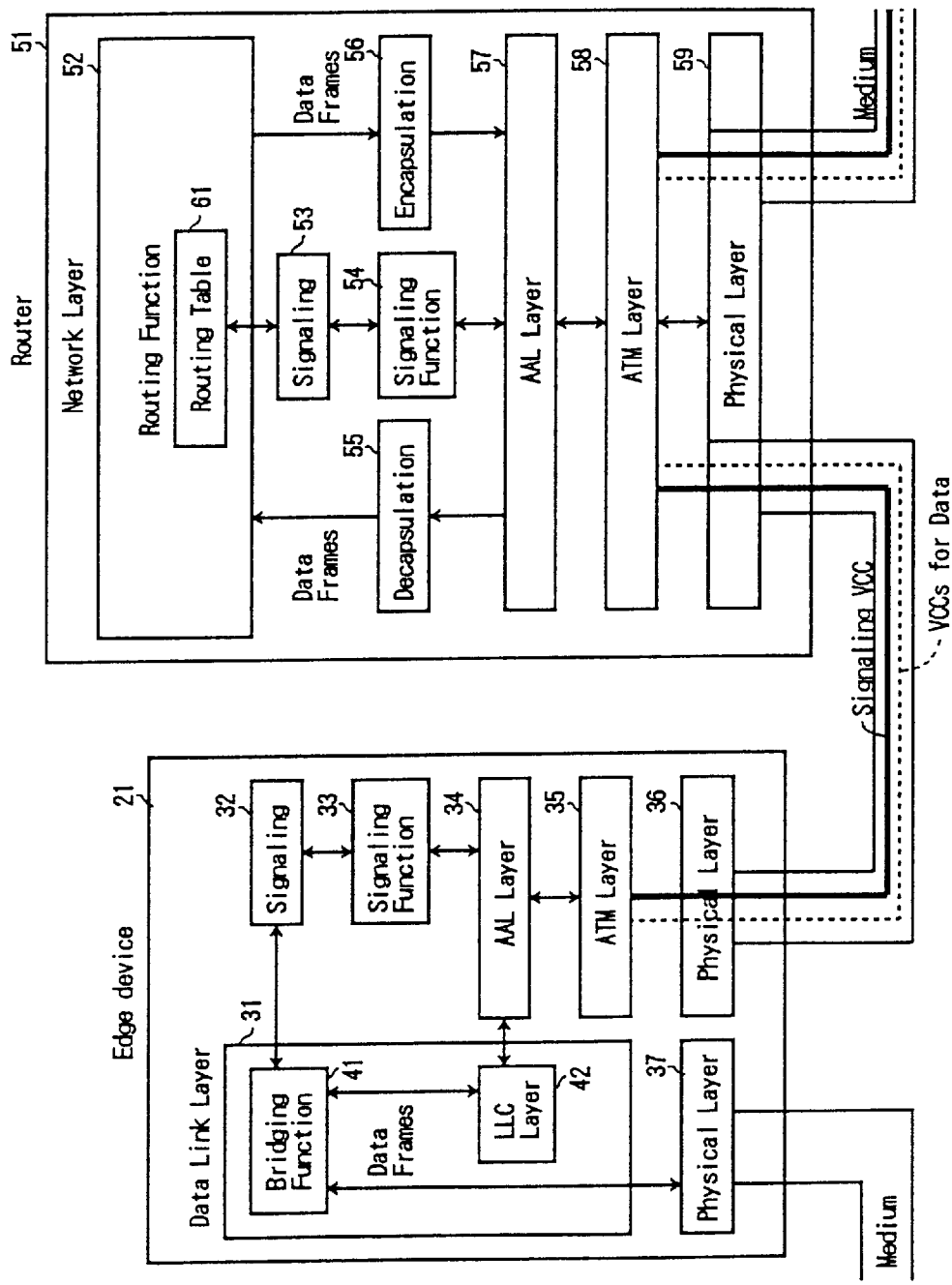
FIG. 12 is a functional block diagram for explaining functions of an edge device and a router when the edge device and the router are formed by the computer system.

FIG. 12 is a functional block diagram for explaining functions of an edge device and a router, in a case where each of the edge device and the router is formed by the computer system shown in FIGS. 10 and 11.

In FIG. 12, an edge device 21 includes a data link layer 31, a signaling part 32, a signaling function 33, an ATM adaptation layer (AAL) 34, an ATM layer 35, and physical layers 36 and 37. The data link layer 31 includes a bridging function 41 and a LLC layer 42.

The edge device 21 is located at an edge of the ATM network, and mutually connects an existing LAN and a logical subnet which is defined in the ATM network. As is in general, the edge device 21 is based on the bridge function 41, and a forwarding process is carried out between the existing LAN and the ATM network by the bridge function 41. For example, whether or not to forward a frame which is generated in the existing LAN to the ATM network via the edge device 21, is judged by referring to a learning table of the MAC address. If it is judged that the forwarding of the frame is necessary, the edge device 21 uses the signaling protocol to set a connection by SVC in an appropriate device such as the router and the edge device in the ATM network. The frame is then encapsulated in the LLC layer 42, and is transmitted after being divided into cells.

On the other hand, a router 51 includes a network layer 52 which includes a routing function and a routing table 61, a signaling part 53, a signaling function 54, a decapsulation function 55, an encapsulation function 56, an AAL layer 57, an ATM layer 58, and a physical layer 59.

The router 51 is based on a router which is used in the internet or LAN environment, and includes an ATM interface, but the router 51 may include an existing LAN interface in combination with the ATM interface. The relay between the ATM interfaces is made by assembling the cells to form the packet, and thereafter determining an output port by a routing process. This routing process refers to the routing table 61 which is created by operating a routing protocol of the routing function, and determines the output port by determining a destination network. Then, a connection is set to an appropriate device such as a router and an edge device in the ATM network using a signaling protocol of the signaling function 54, and cells which are generated by dividing the frame are output.

Although not shown in FIG. 12, functions of the address resolution server may be provided within the edge device 21 or the router 51.

Figure 13:
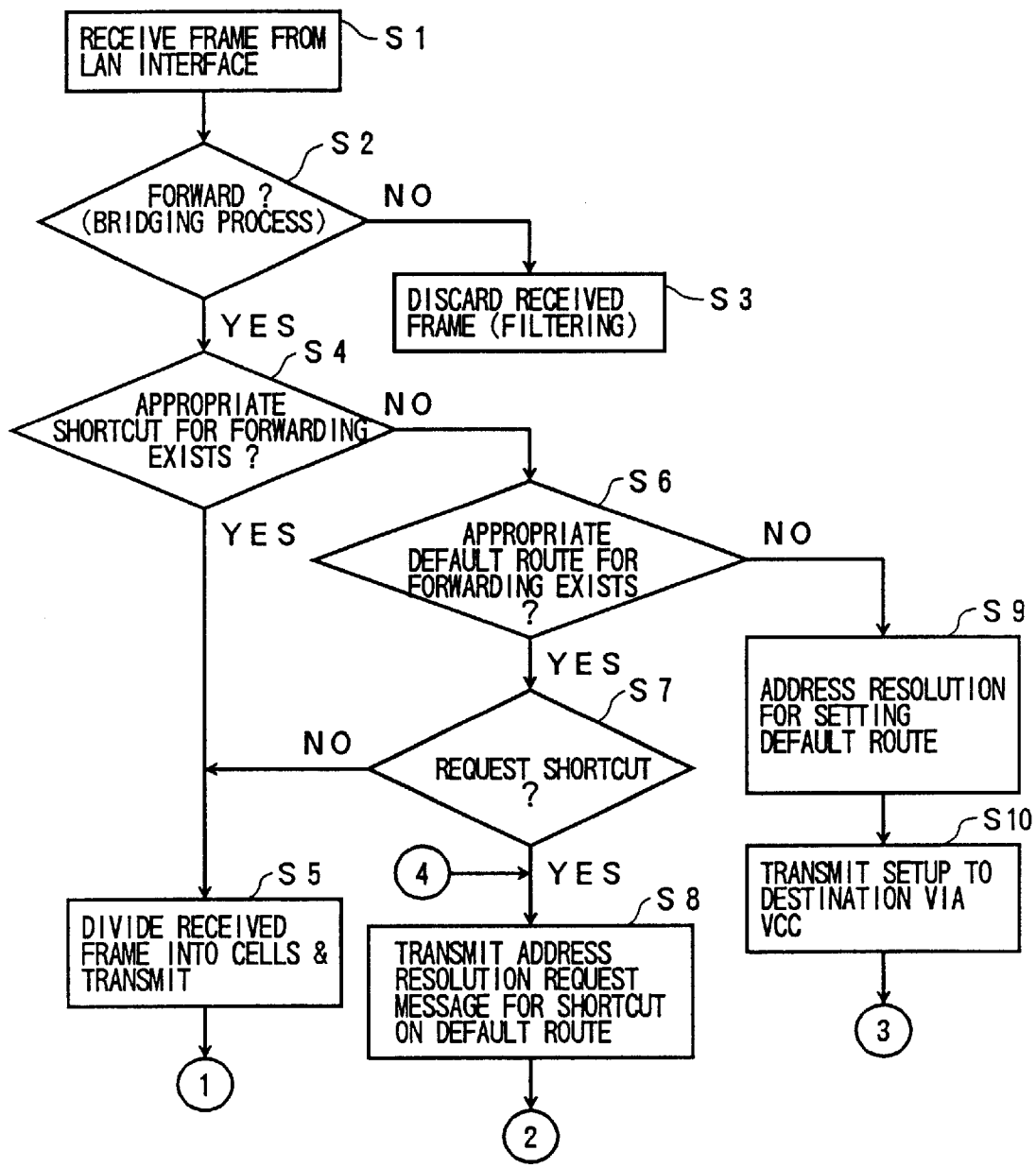
FIG. 13 is a flow chart for explaining a process of a CPU of the computer system which operates as a transmitting source edge device.
Figure 14:
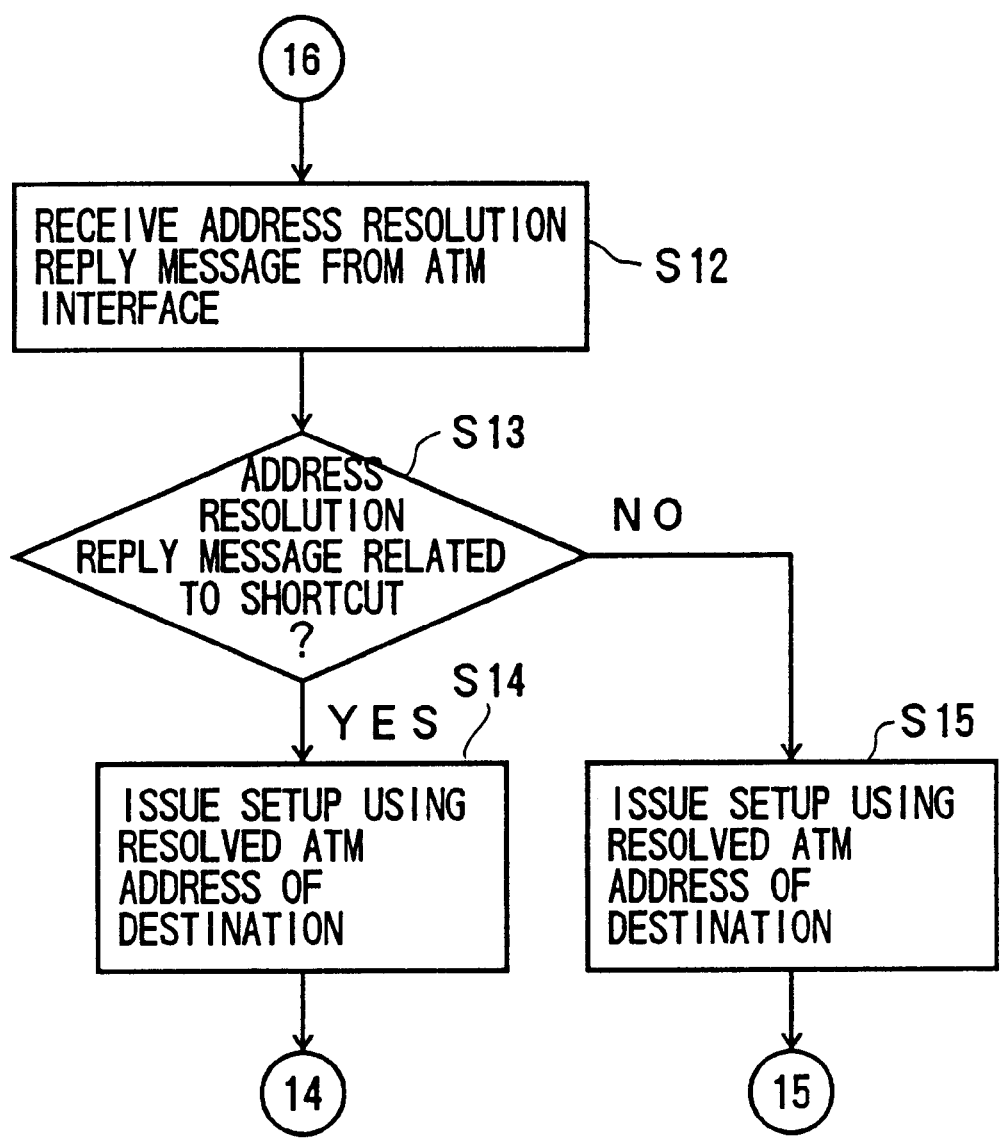
FIG. 14 is a flow chart for explaining the process of the CPU of the computer system which operates as the transmitting source edge device.
Figure 15:
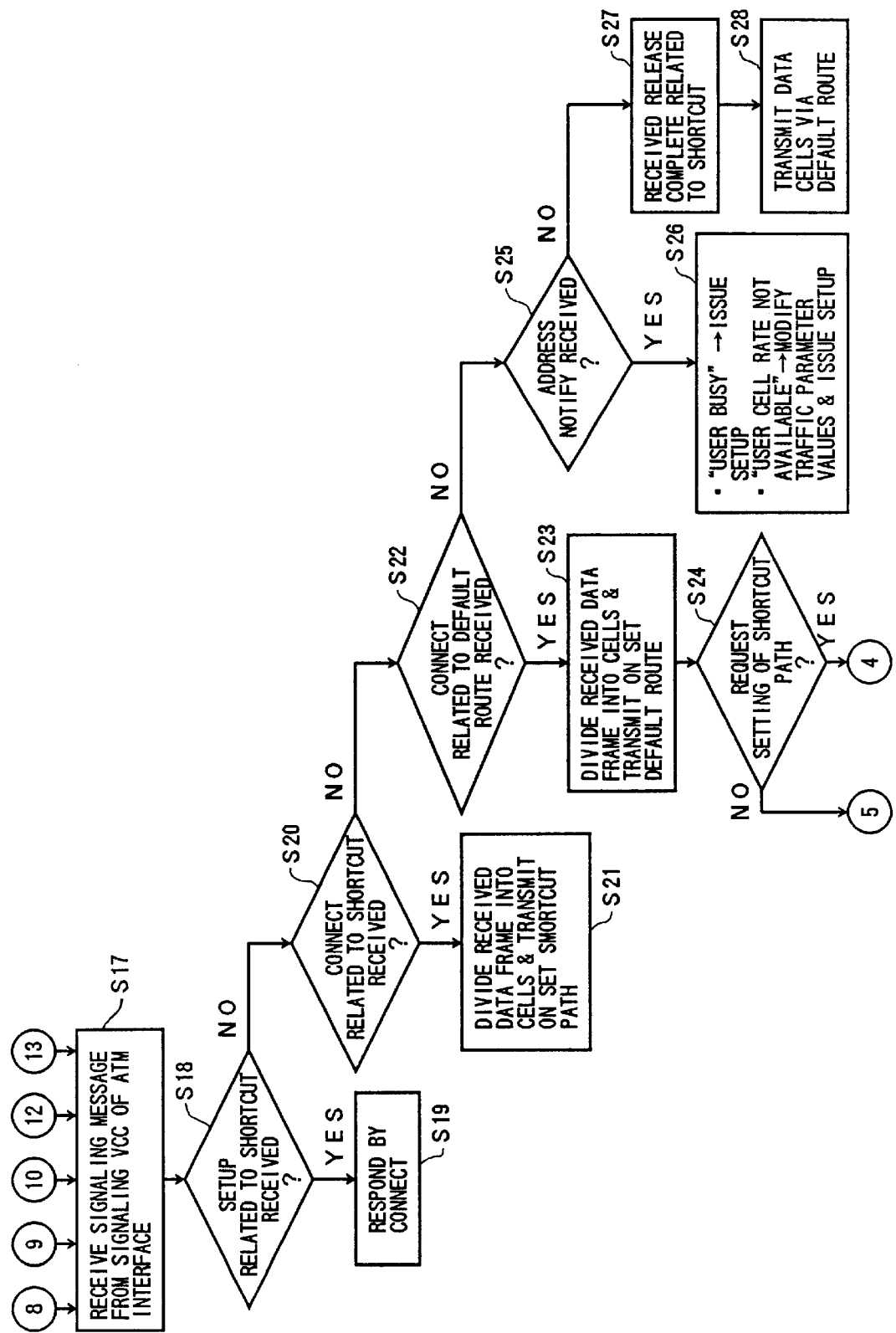
FIG. 15 is a flow chart for explaining the process of the CPU of the computer system which operates as the transmitting source edge device.

Next, a description will be given of the process of the CPU 11 when the computer system shown in FIGS. 10 and 11 is to operate as the transmitting source edge device, by referring to FIGS. 13 through 15. FIGS. 13 through 15 respectively are flow charts for explaining the process of the CPU 11 of the computer system which operates as the transmitting source edge device. In this case, the disk 110 stores a program for making the CPU 11 carry out the process shown in FIGS. 13 through 15, and it is assumed for the sake of convenience that this program is loaded into the computer system.

In FIG. 13, a step S1 receives a frame from the LAN interface, and a step S2 decides whether the received frame is to be forwarded by a bridging process. If the decision result in the step S2 is NO, a step S3 discards the received frame by a filtering process. On the other hand, if the decision result in the step S2 is YES, a step S4 decides whether or not an appropriate shortcut path exists for the forwarding. If the decision result in the step S4 is YES, a step S5 transmits the received frame by dividing the frame into cells, and the process advances to a step S51 within the process of the destination edge device shown in FIG. 18 which will be described later.

On the other hand, if the decision result in the step S4 is NO, a step S6 decides whether or not an appropriate default route exists for the forwarding. If the decision result in the step S6 is YES, a step S7 decides whether or not to request a shortcut. The process advances to the step S5 if the decision result in the step S7 is NO, and the process advances to a step SB if the decision result in the step S7 is YES. The step S8 transmits an address resolution request message for the shortcut, on the default route, by a standard shortcut path setting procedure, and the process advances to a step S31 within the process of the router shown in FIG. 16 which will be described later.

If the decision result in the step S6 is NO, a step S9 carries out an address resolution to set the default route. In other words, an ATM address of the destination router or edge device is acquired from an address resolution server within the subnet. A step S10 transmits a SETUP message to the destination device via a signaling VCC. In this embodiment, information elements indicating the transmitting source ATM address and the destination IP address are included in this SETUP message. After the step S10, the process advances to a step S35 within the process of the router shown in FIG. 17 which will be described later.

In FIG. 14, a step S12 is carried out after a step S60 within the process of the destination edge device shown in FIG. 18 which will be described later, and receives an address resolution reply message from the ATM interface. A step S13 decides whether or not the received address resolution reply message is an address resolution reply message related to a shortcut. The process advances to a step S14 if the decision result in the step S13 is YES, and the process advances to a step S15 if the decision result in the step S13 is NO. The step S14 issues a SETUP message using the ATM address of the resolved destination edge device, and the process advances to a step S71 within the process of the destination edge device shown in FIG. 19 which will be described later. On the other hand, the step S15 issues a SETUP message using the ATM address of the resolved destination device, that is, the destination router or edge device, and the process advances to the step S35 within the process of the router shown in FIG. 17 which will be described later.

In FIG. 15, a step S17 is carried out after a step S40 within the process of the router shown in FIG. 17 which will be described later or, after a step S75, S76, S80 or S81 within the process of the destination edge device shown in FIG. 19 which will be described later. The step S17 receives a signaling message from a signaling VCC of the ATM interface. A step S18 decides whether or not a SETUP message related to a shortcut is received, and if the decision result is YES, a step S19 responds by a CONNECT message. If the decision result in the step S18 is NO, a step S20 decides whether or not a CONNECT message related to a shortcut is received. If the decision result in the step S20 is YES, a step S21 divides the received data frame into cells, and sends the cells on the set shortcut path. If the decision result in the step S20 is NO, a step S22 decides whether or not a CONNECT message related to a default route is received. If the decision result in the step S22 is YES, a step S23 divides the received data frame into cells, and sends the cells on the set default route. In addition, a step S24 decides whether or not to request setting of a shortcut. The process advances to the step S8 within the process of the transmitting source edge device shown in FIG. 13 if the decision result in the step S24 is YES, and the process advances to the step S31 within the process of the router shown in FIG. 16 which will be described later.

On the other hand, if the decision result in the step S22 is NO, a step S25 decides whether or not an ADDRESS NOTIFY message is received. If the decision result in the step S25 is YES, a step S26 issues a SETUP message after a predetermined time if a cause included in the ADDRESS NOTIFY message indicates "user busy" or the like. In addition, the step S26 issues the SETUP message after modifying traffic parameter values or the like if the cause included in the ADDRESS NOTIFY message indicates "user cell rate not available" or the like. In addition, if the decision result in the step S25 is NO, a step S27 receives a RELEASE COMPLETE message related to the shortcut, and a step S28 sends the data cells via the default route.

Figure 16:
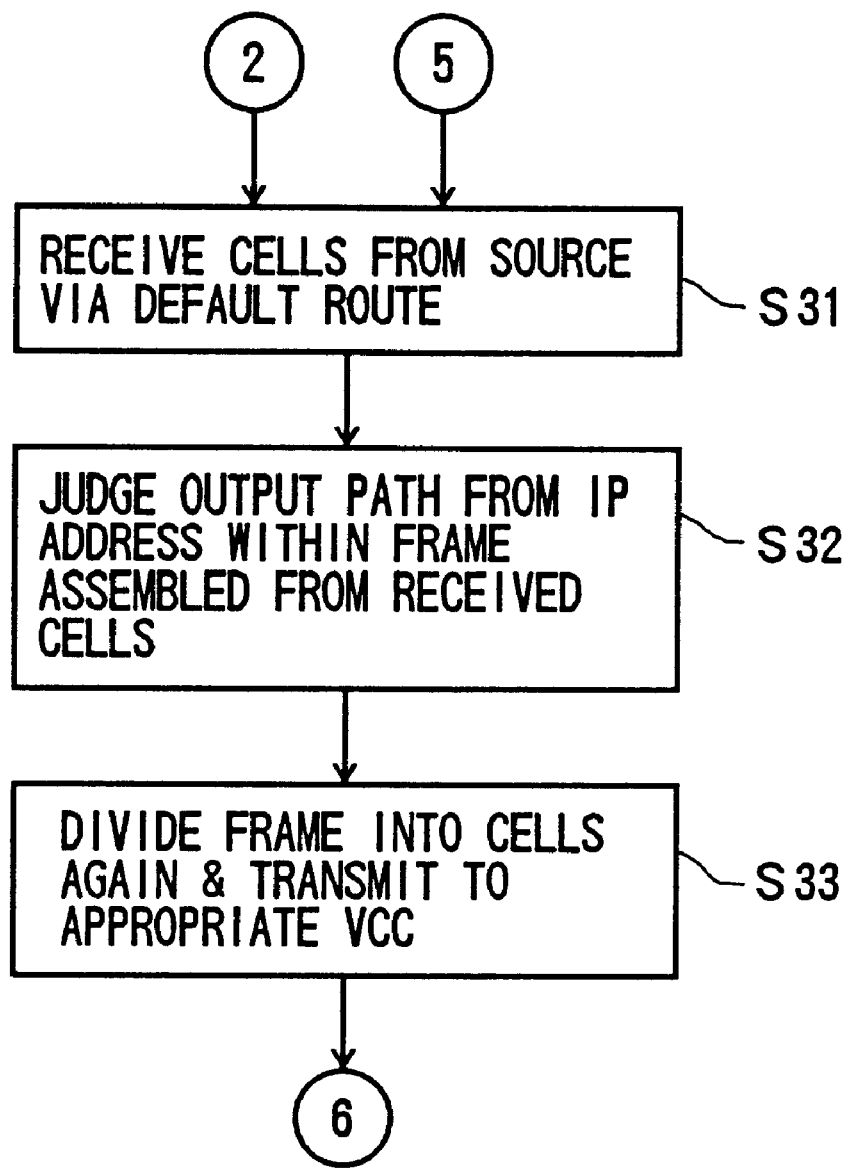
FIG. 16 is a flow chart for explaining a process of the CPU of the computer system which operates as the router.

Next, a description will be given of the process of the CPU 11 when the computer system shown in FIGS. 10 and 11 is to operate as the router, by referring to FIGS. 16 and 17. FIGS. 16 and 17 respectively are flow charts for explaining the process of the CPU 11 of the computer system which operates as the router. In this case, the disk 110 stores a program for making the CPU 11 carry out the process shown in FIGS. 16 and 17, and it is assumed for the sake of convenience that this program is loaded into the computer system.

In FIG. 16, after the step S8 within the process of the transmitting source edge device shown in FIG. 13 or, if the decision result in the step S24 shown in FIG. 15 is NO, the step S31 receives the cells from the transmitting source via the default route. The cells received in this case are data or the address resolution request message for the shortcut. A step S32 assembles the received cells to form a frame, and carries out a routing process to judge an output path from the destination IP address within the frame. A step S33 divides the frame into cells again, and sends the cells to an appropriate default route, that is, the VCC. After the step S33, the process advances to the step S51 within the process of the destination edge device shown in FIG. 18 which will be described later.

Figure 17:
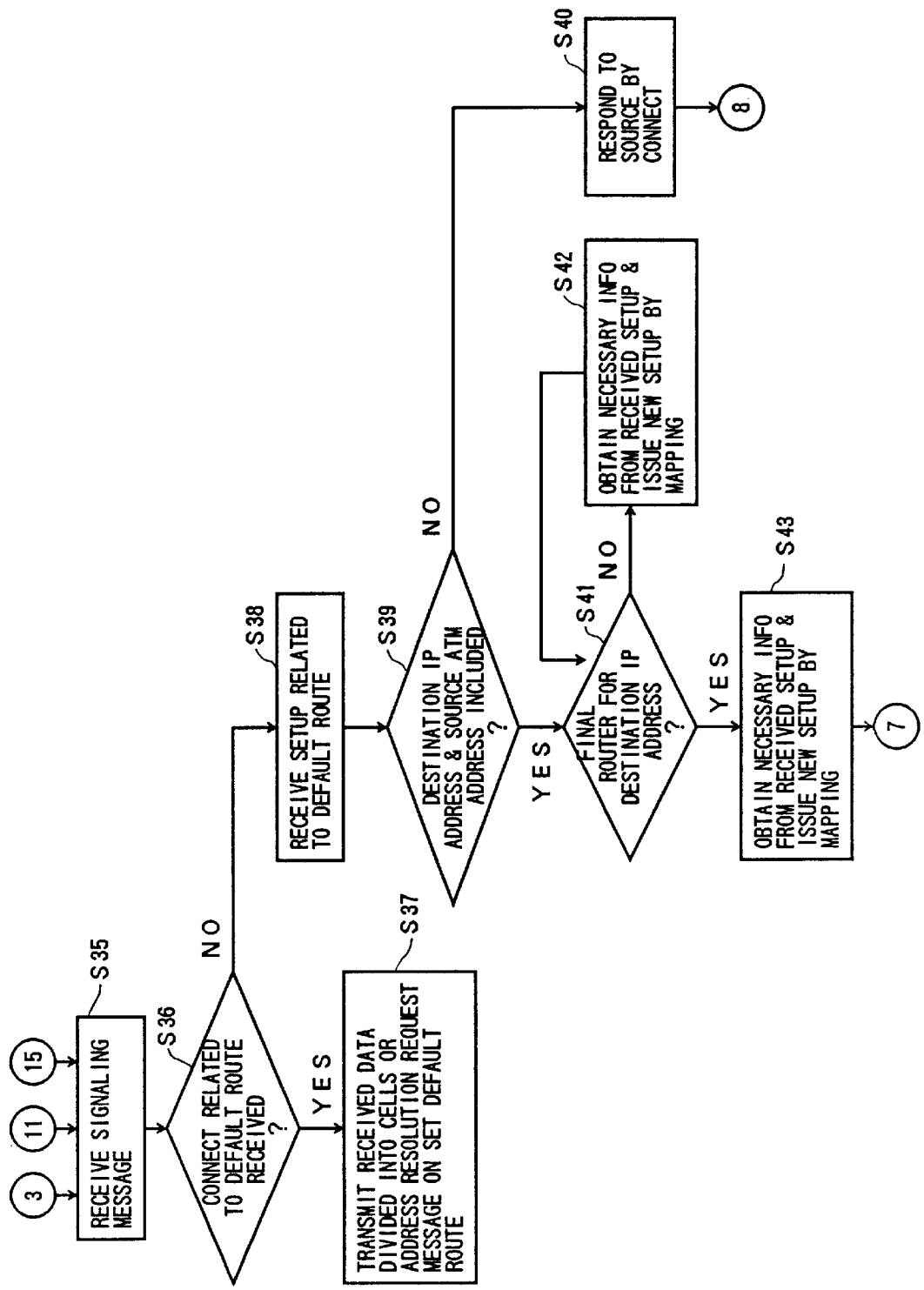
FIG. 17 is a flow chart for explaining the process of the CPU of the computer system which operates as the router.

In FIG. 17, after the step S10 within the process of the transmitting source edge device shown in FIG. 13, after the step S83 within the process of the destination edge device shown in FIG. 19 which will be described later or, after the step S15 within the process of the transmitting source edge device shown in FIG. 14, a the step S35 receives a signaling message. A step S36 decides whether or not a CONNECT message related to the default route is received. If the decision result in the step S36 is YES, a step S37 sends on the set default route the received data which is divided into the cells or, the address resolution request message related to the shortcut.

On the other hand, if the decision result in the step S36 is NO, a step S38 receives a SETUP message related to the default route. A step S39 decides whether or not the destination IP address and the transmitting source ATM address are included in the received SETUP message. If the decision result in the step S39 is NO, a step S40 responds to the transmitting source by a CONNECT message, and the process advances to the step S17 within the process of the transmitting source edge device shown in FIG. 15. If the decision result in the step S39 is YES, a step S41 decides whether or not the router itself is a final router for the destination IP address. If the decision result in the step S41 is NO, a step S42 obtains necessary information from the received SETUP message, and issues a new SETUP message by mapping the obtained information into the new SETUP message. The process returns to the step S41 after the step S42. On the other hand, if the decision result in the step S41 is YES, a step S43 obtains necessary information from the received SETUP message, and issues a new SETUP message by mapping the obtained information into the new SETUP message. After the step S4, the process advances to the step S71 within the process of the destination edge device shown in FIG. 19 which will be described later.

Next, a description will be given of the process of the CPU 11 when the computer system shown in FIGS. 10 and 11 is to operate as the destination edge device, by referring to FIGS. 18 and 19. FIGS. 18 and 19 respectively are flow charts for explaining the process of the CPU 11 of the computer system which operates as the destination edge device. In this case, the disk 110 stores a program for making the CPU 11 carry out the process shown in FIGS. 18 through 19, and it is assumed for the sake of convenience that this program is loaded into the computer system.

Figure 18:
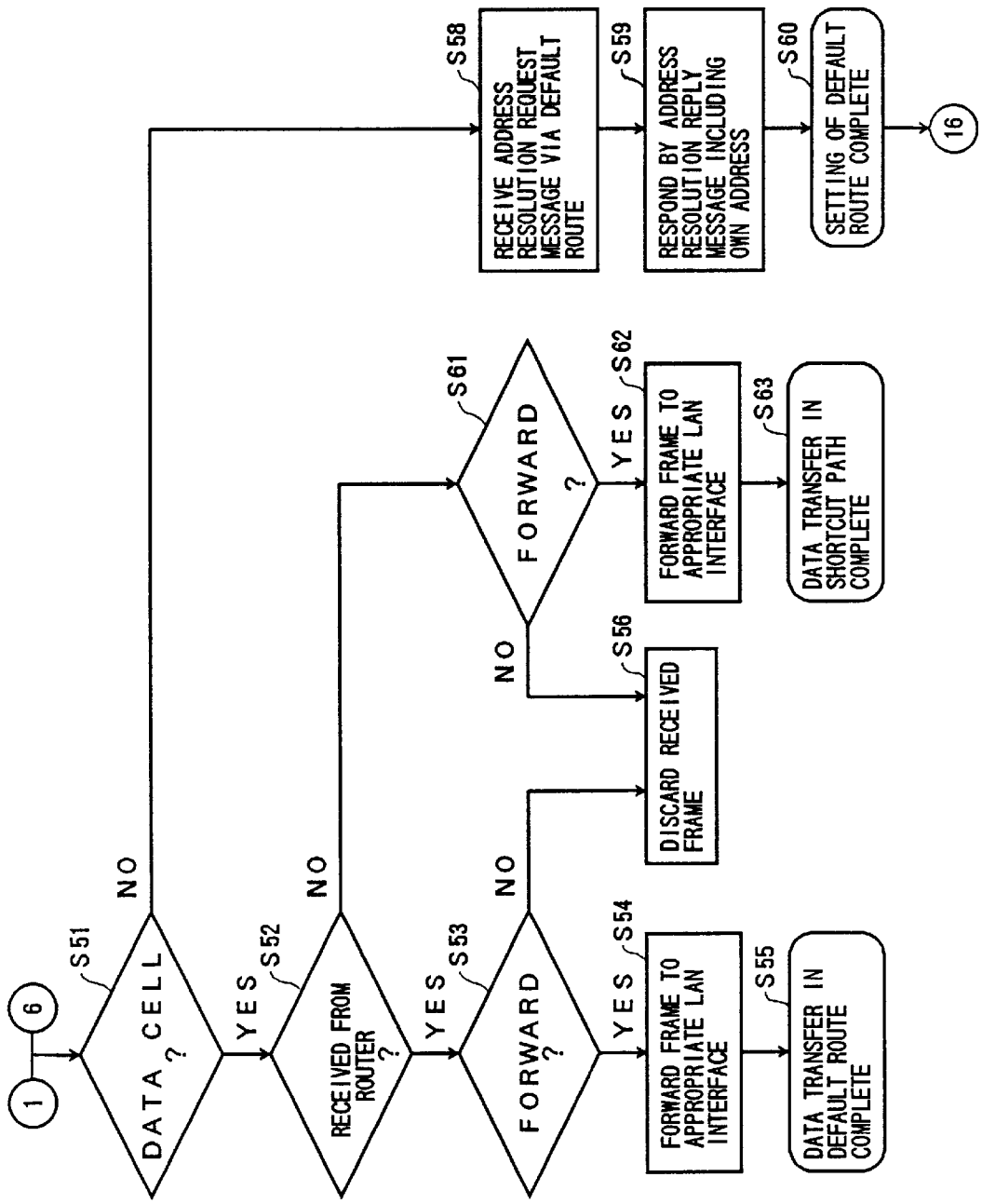
FIG. 18 is a flow chart for explaining a process of the CPU of the computer system which operates as a destination edge device.

In FIG. 18, after the step S5 within the process of the transmitting source edge device shown in FIG. 13 or, after the step S33 within the process of the router shown in FIG. 16 or, the step S51 decides whether or not the received frame takes the form of data cells. If the decision result in the step S51 is YES, a step S52 decides whether or not the data cells are received from the router. If the decision result in the step S52 is YES, a step S53 decides whether or not to forward the received data cells by a bridging process. If the decision result in the step S53 is YES, a step S54 forwards the frame to an appropriate LAN interface, and a step S55 completes a data transfer by the default route. On the other hand, if the decision result in the step S53 is NO, a step S56 discards the received frame by a filtering process.

If the decision result in the step S51 is NO, a step S58 receives an address resolution request message via the default route, and a step S59 responds by an address resolution reply message which includes the ATM address of the destination edge device itself. A step S60 completes setting of the default route, and the process advances to the step S12 within the process of the transmitting source edge device shown in FIG. 14.

On the other hand, if the decision result in the step S52 is NO, a step S61 decides whether or not to forward the received frame by a bridging process. The process advances to the step S56 if the decision result in the step S61 is NO. In addition, if the decision result in the step S61 is YES, a step S2 forwards the frame to an appropriate LAN interface, and a step S63 completes the data transfer by the shortcut.

Figure 19:
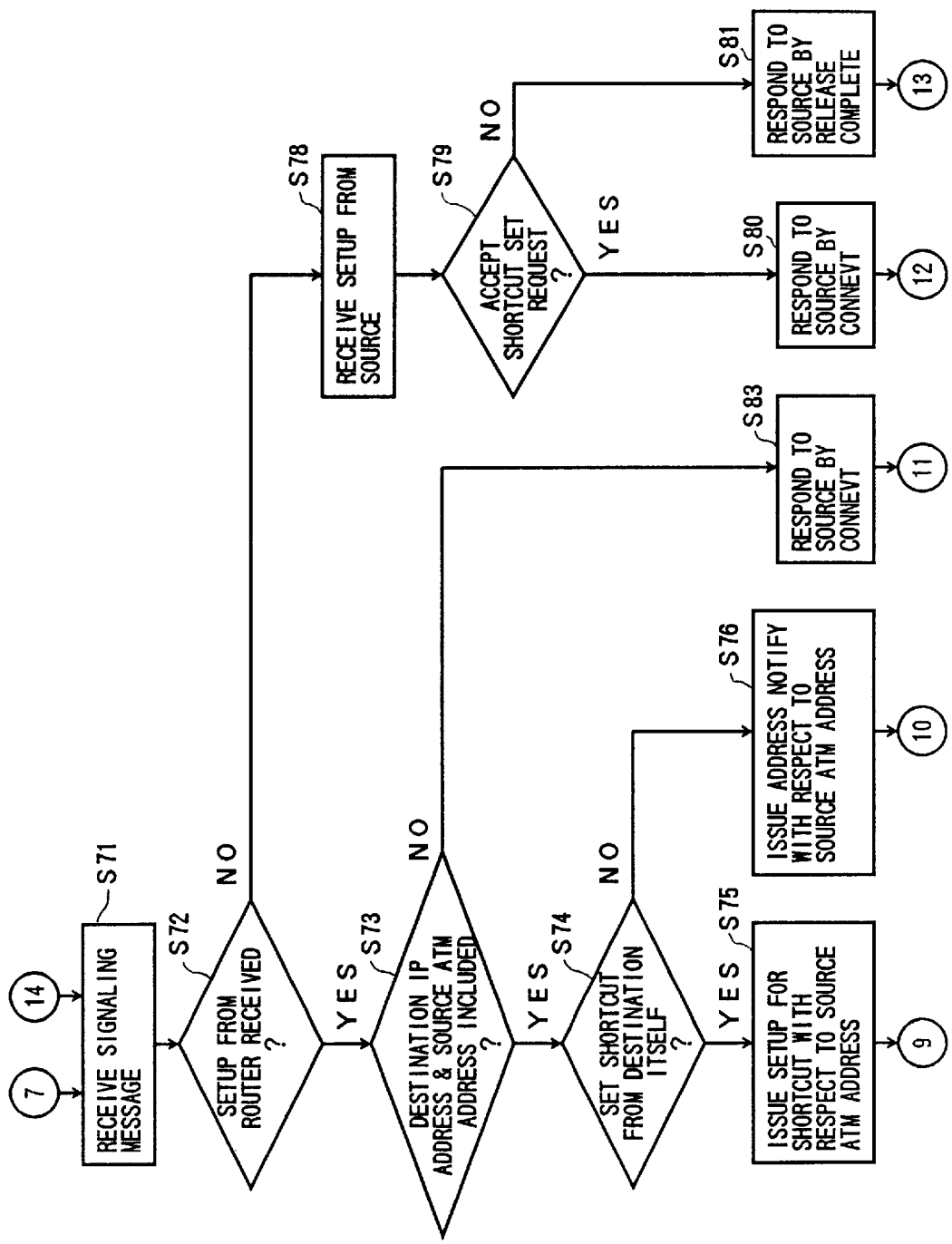
FIG. 19 is a flow chart for explaining the process of the CPU of the computer system which operates as the destination edge device.

In FIG. 19, after the step S43 within the process of the router shown in FIG. 17 or, after the step S14 within the process of the transmitting source edge device shown in FIG. 14, the step S71 receives a signaling message. A step S72 decides whether or not a SETUP message from the router is received. If the decision result in the step S72 is YES, a step S73 decides whether or not the destination IP address and the transmitting source ATM address are included in the received SETUP message. If the decision result in the step S73 is YES, a step S74 decides whether or not a shortcut is to be set from the destination edge device itself. If the decision result in the step S74 is YES, a step S75 issues a SETUP message for the shortcut, with respect to the ATM address of the transmitting source. This issued SETUP message also includes the ATM address of the destination edge device itself. After the step S75, the process advances to the step S17 within the process of the transmitting source edge device shown in FIG. 15. On the other hand, if the decision result in the step S74 is NO, a step S76 issues an ADDRESS NOTIFY message with respect to the ATM address of the transmitting source. This issued ADDRESS NOTIFY message also includes the ATM address of the destination edge device itself. After the step S76, the process advances to the step S17 within the process of the transmitting source edge device shown in FIG. 15.

If the decision result in the step S72 is NO, a step S78 receives a SETUP message from the transmitting source edge device, and a step S79 decides whether or not to accept a shortcut set request. If the decision result in the step S79 is YES, a step S80 responds to the transmitting source by a CONNECT message, and the process advances to the step S17 within the process of the transmitting source edge device shown in FIG. 15. On the other hand, if the decision result in the step S79 is NO, a step S81 responds to the transmitting source by a RELEASE COMPLETE message, and the process advances to the step S17 within the process of the transmitting source edge device shown in FIG. 15. In addition, if the decision result in the step S73 is NO, a step S83 responds to the transmitting source router by a CONNECT message, and the process advances to the step S35 within the process of the router shown in FIG. 17.

Further, the present invention is not limited to these embodiments, but various variations and modifications may be made without departing from the scope of the present invention.

What is claimed is:

1. A path setting method in a connection oriented network, comprising:
resolving address information to set a shortcut path between a source device and a destination device, by propagating at least one signaling message from the source to the destination, each including source address information, and based on a transmission of another signaling message transmitted by the destination, including destination address information, in response to receipt by the destination of the at least one signaling message propagated from the source.

2. The path setting method of claim 1, wherein the resolving of address information to set a shortcut path is performed by at least one of the source, destination, a router, or a server.

3. A path setting device in a connection oriented network, comprising:
a communication unit to resolve address information to set a shortcut path between a source and a destination, by propagating at least one signaling message from the source to the destination, each including source address information, and based on another signaling message transmitted by the destination, including destination address information, in response to receipt by the destination of the at least one signaling message propagated from the source.

4. The path setting device of claim 3, wherein the judging unit can be at any of the source, the destination, a router, or a server.

5. The path setting device of claim 3, wherein the address information of the source is notified to the destination in a subnet different from a subnet in which the source belongs.

6. The path setting device of claim 3, wherein the communication unit requests a setting of a connection directly to the source from the communication unit when the communication unit is at the destination, based on the source address as propagated from the source in the at least one signaling message.

7. The path setting device of claim 3, wherein the communication unit further includes defined information elements in the at least one signaling message propagated from the source when the communication unit is at the source, so as to enable the destination to specify a quality of a connection when the destination requests a setting of the connection.

8. The path setting device of claim 3, wherein the communication unit decides whether or not to accept a setting of a connection directly to the source from the destination based on information elements included in the at least one signaling message as propagated from the source and received by the communication unit, when the communication unit is at the destination.

9. The path setting device of claim 3, wherein the communication unit transmits directly to the source the other signaling message which includes information elements indicating parameter values that may be requested by the communication unit when the communication unit is at the destination, when it is not possible to set a requested connection, directly to the source from the destination, based on parameter values specified within the at least one signaling message as propagated from the source and received by the destination.

10. The path setting device of claim 3, wherein the communication unit includes, in the other signaling message that is transmitted to the source when the communication unit is at the destination and the destination cannot set a connection directly to the source, the address information of the destination so that the connection can be set from the source.

11. The path setting device of claim 3, wherein the communication unit determines a quality of a connection which is to be set and can be requested by the communication unit, when the communication unit is at the source, based on a comparison result of parameter values within information elements included in the other signaling message from the destination and parameter values within the information elements included in the at least one signaling message as transmitted from the source.

12. The path setting device of claim 3, wherein the communication unit indicates an identifier in the at least one signaling message issued from the communication unit when the communication unit is at the source, said identifier associating the at least one signaling message with the other signaling message as issued from the destination; and wherein the communication unit maps an identifier, in a signaling message, of the at least one signal messages, as received by the communication unit when the communication unit is at the destination, into the other signaling message as transmitted from the destination communication unit to the source.

13. The path setting device of claim 12, wherein the communication unit at the source distinguishes the other signaling message as received by the communication unit, and alternative signaling messages by recognizing the identifier of the at least one signaling message.

14. The path setting device of claim 5, wherein the communication unit distinguishes the other signaling message and alternative signaling messages by recognizing address information included in the received other signaling message.

15. The path setting device of claim 5, further comprising:
a cache to store the address information included in the other signaling message in said cache, so as to set a direct connection to a device in a subnet different from a subnet in which the communication unit belongs.

16. A communication unit having a connection oriented network as an infrastructure, wherein address information for setting a shortcut path between a source device and a destination device using a signaling message is resolved, wherein address information of the source device is notified to the destination device in a subnet different from a subnet to which the source device belongs by including address information of the source device in at least one signaling message propagated from the source device, said communication unit comprising:

a judging unit to select a network to which the destination device belongs, based on destination address information obtained from another signaling message transmitted from the destination device, by retrieving a routing table generated from a routing protocol operating in a high-level layer.

17. The communication unit of claim 16, wherein the resolving of address information to set a shortcut path is performed by at least one of the source, destination, a router, or a server.

18. The communication unit of claim 16, further comprising:

a unit to copy contents of a received SETUP message to issue a new SETUP message with respect to a network to which the destination device belongs if the communication unit belongs to a network different from the network to which the destination device belongs, and with respect to the destination device if the communication unit and the destination unit belong to the same network, after judging the network to which the destination device belongs.

19. The communication unit of claim 16, further comprising:

a unit to recognize a received signaling message, of the at least one signaling messages, as a signaling message and transmitting the other signaling message to the source device, so as to provide a connection for a case where a direct connection between the source device and the destination device cannot be set by the communication.

20. The communication unit of claim 16, wherein:
the source device indicates in the at least one signaling message propagated from the source device an identifier for associating the at least one signaling message with the other signaling message as issued from the destination device; and
the destination device maps the identifier in the at least one signaling message into the other signaling message which is transmitted from the destination device to the source device, wherein the communication unit further comprises a distinguishing unit, when the communication unit is at the source device, to distinguish the other signaling message and alternative signaling messages by recognizing the identifier.

21. The communication unit of claim 16, further comprising:
a distinguishing unit to distinguish the other signaling message, as received by the source device, and alternative signaling messages by recognizing address information included in the other signaling message.

22. The communication unit of claim 16, further comprising:

a cache to store address information included in the other signaling message in said cache, so as to set a direct connection to a device in a subnet different from a subnet in which the communication unit belongs.

23. The communication unit of claim 22, further comprising:

a transmitting unit to transmit a message to the source device, the message including the address information stored in said cache, when a signaling message related to the stored address information is received.

24. A computer-readable storage medium which stores a program for causing a computer having a communication function to set a path in a connection oriented network, comprising:

code to resolve address information for setting a shortcut path between a source and a destination by propagating at least one signaling message, each including source address information, and based on another signaling message transmitted by the destination, including destination address information, in response to receipt by the destination of the at least one signaling message propagated from the source.

25. The computer-readable storage medium of claim 24, wherein the resolving of address information to set a shortcut path is performed by at least one of the source, destination, a router, or a server.

* * * * *